(12) United States Patent
Zhang et al.

(10) Patent No.: US 12,170,768 B2
(45) Date of Patent: *Dec. 17, 2024

(54) TABLE MAINTENANCE FOR HMVP CANDIDATE STORAGE

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,788

(22) Filed: Jul. 10, 2023

(65) Prior Publication Data

US 2023/0353737 A1 Nov. 2, 2023

Related U.S. Application Data

(63) Continuation of application No. 17/403,750, filed on Aug. 16, 2021, now Pat. No. 11,700,371, which is a
(Continued)

(30) Foreign Application Priority Data

Nov. 2, 2018 (WO) ................ PCT/CN2018/113716
May 9, 2019 (WO) ................ PCT/CN2019/086174

(51) Int. Cl.
*H04N 19/119* (2014.01)
*H04N 19/139* (2014.01)
(Continued)

(52) U.S. Cl.
CPC ......... *H04N 19/119* (2014.11); *H04N 19/139* (2014.11); *H04N 19/176* (2014.11); *H04N 19/521* (2014.11); *H04N 19/58* (2014.11)

(58) Field of Classification Search
CPC .. H04N 19/119; H04N 19/176; H04N 19/521; H04N 19/58

See application file for complete search history.

(56) References Cited

U.S. PATENT DOCUMENTS 7,068,850 B2 6/2006 Youn
9,485,520 B2 11/2016 Zhou
(Continued)

FOREIGN PATENT DOCUMENTS

AU 2015202844 A1 6/2015
CN 101026758 A 8/2007
(Continued)

OTHER PUBLICATIONS

Bross et al. "Versatile Video Coding (Draft 3)," Joint Video Experts Team (JVET)of ITU-T SG 16 WP 3 and ISO/IEC JTC 1/SC 29/WG 1112th Meeting: Macao, CN, Oct. 3-12, 2018, document JVET-L1001, 2018. section 7.4.5.8, section 8.4.7, sections 8.4.2.10 and 8.4.2.11, section 8.4.2.15.
(Continued)

*Primary Examiner* — Tsion B Owens
(74) *Attorney, Agent, or Firm* — Conley Rose, P.C.

(57) ABSTRACT

The disclosure relates to table maintenance for HMVP candidate storage. A method for processing video, including: determining, during a conversion between a first block of visual media data and a corresponding coded representation of the visual media data, the first block being coded with geometry partition mode; determining, based on at least one table storing history based motion vector prediction (HMVP) candidates which include motion information
(Continued)

(a) second PU of Nx2N (b) second PU of 2NxN based on previously coded blocks, motion information of at least one sub-portion of the first block; performing the conversion of the first block using the determined motion information.

20 Claims, 42 Drawing Sheets

Related U.S. Application Data continuation of application No. 17/019,581, filed on Sep. 14, 2020, now Pat. No. 11,122,266, which is a continuation of application No. PCT/CN2019/115453, filed on Nov. 4, 2019.

(51) Int. Cl.
*H04N 19/176* (2014.01)
*H04N 19/513* (2014.01)
*H04N 19/58* (2014.01)

(56) References Cited

U.S. PATENT DOCUMENTS

| | | | |
|---|---|---|---|
| 11,122,266 B2 | 9/2021 | Zhang | |
| 2004/0101059 A1 | 5/2004 | Joch | |
| 2009/0196342 A1 | 8/2009 | Divorra Escoda | |
| 2010/0111182 A1 | 5/2010 | Karczewicz | |
| 2010/0208827 A1 | 8/2010 | Divorra Escoda | |
| 2011/0200110 A1 | 8/2011 | Chen | |
| 2014/0098880 A1 | 4/2014 | Seregin | |
| 2014/0169469 A1 | 6/2014 | Bernal | |
| 2015/0319459 A1 | 11/2015 | Zheng | |
| 2016/0366435 A1 | 12/2016 | Chien | |
| 2017/0054996 A1* | 2/2017 | Xu | H04N 19/593 |
| 2017/0238011 A1* | 8/2017 | Pettersson | H04N 19/54 375/240.12 |
| 2017/0332095 A1 | 11/2017 | Zou | |
| 2017/0332099 A1 | 11/2017 | Lee | |
| 2018/0103273 A1 | 4/2018 | Guo | |
| 2020/0099951 A1 | 3/2020 | Hung | |
| 2020/0107017 A1 | 4/2020 | Hung | |
| 2020/0112741 A1* | 4/2020 | Han | H04N 19/513 |
| 2020/0120334 A1 | 4/2020 | Xu | |
| 2020/0137398 A1 | 4/2020 | Zhao | |
| 2020/0169745 A1 | 5/2020 | Han | |
| 2020/0169754 A1 | 5/2020 | Wang | |
| 2020/0260113 A1 | 8/2020 | Han | |
| 2020/0275093 A1 | 8/2020 | Lin | |
| 2020/0359049 A1 | 11/2020 | Zhao | |
| 2020/0404254 A1 | 12/2020 | Zhao | |
| 2021/0006787 A1 | 1/2021 | Zhang | |
| 2021/0006788 A1 | 1/2021 | Zhang | |
| 2021/0006803 A1 | 1/2021 | Zhang | |
| 2021/0051324 A1 | 2/2021 | Zhang | |
| 2021/0092379 A1 | 3/2021 | Zhang | |
| 2021/0385451 A1 | 12/2021 | Zhang | |
| 2021/0400258 A1 | 12/2021 | Li | |

FOREIGN PATENT DOCUMENTS

| | | |
|---|---|---|
| CN | 101257625 A | 9/2008 |
| CN | 101523917 A | 9/2009 |
| CN | 101822064 A | 9/2010 |
| CN | 102026002 A | 4/2011 |
| CN | 102484706 A | 5/2012 |
| CN | 102763415 A | 10/2012 |
| CN | 102845062 A | 12/2012 |
| CN | 102860006 A | 1/2013 |
| CN | 102946536 A | 2/2013 |
| CN | 103069802 A | 4/2013 |
| CN | 104160704 A | 11/2014 |
| CN | 104363451 A | 2/2015 |
| CN | 106105199 A | 11/2016 |
| CN | 107005700 A | 8/2017 |
| CN | 107079161 A | 8/2017 |
| CN | 107113424 A | 8/2017 |
| CN | 107277540 A | 10/2017 |
| CN | 108353184 A | 7/2018 |
| CN | 111147847 B | 5/2024 |
| EP | 2717579 A1 | 4/2014 |
| EP | 3346709 A1 | 7/2018 |
| EP | 3349467 A1 | 7/2018 |
| JP | 2015173404 A | 10/2015 |
| KR | 20120010367 A | 2/2012 |
| KR | 20170108367 A | 9/2017 |
| RU | 2550554 C2 | 5/2015 |
| RU | 2659733 C2 | 7/2018 |
| WO | 2016091161 A1 | 6/2016 |
| WO | 2017003063 A1 | 1/2017 |
| WO | 2017197126 A1 | 11/2017 |
| WO | 2018048904 A1 | 3/2018 |
| WO | 2018049043 A1 | 3/2018 |
| WO | 2018128466 A1 | 7/2018 |
| WO | 2018133343 A1 | 7/2018 |
| WO | 2020008346 A1 | 1/2020 |
| WO | 2020156464 A1 | 8/2020 |

OTHER PUBLICATIONS

Liao et al. "CE10.3.1.b:Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.

Zhang et al. "CE4-related: History-based Motion Vector Prediction", Joint Video Experts Team {JVET) of ITU-T SG 6 WP 3 and ISO/IEC JTC 1/SC 29/WG 11, 11th Meeting, Ljubljana, SI, (Jul. 10-18, 2018), Document JVET-K0104, 2018.

Zhang et al. "CE4-4.4: Merge List Construction for Triangular Prediction Mode," Joint Video Experts Team (JVET)of ITU-T SG 16 WP 3 and ISO/IEC JTC 1/SC 29/WG 1114th Meeting: Geneva, CH, Mar. 19-27, 2019, document JVET-N0269, 2019.

Wang et al. "CE4-related: An Improved Method for Triangle Merge List Construction," Joint Video Experts Team (JVET) of ITU-T SG 16 WP 3 and ISO/IEC JTC 1/SC 29/WG 1114th Meeting: Geneva, CH, Mar. 19-27, 2019, document JVET-N0340, 2019.

Tamse et al. "CE4.4.2: Triangular Prediction Mode Harmonization," Joint Video Experts Team (JVET)of ITU-T SG 16 WP 3 and ISO/IEC JTC 1/SC 29/WG 1114th Meeting: Geneva, CH, Mar. 19-27, 2019, document JVET-N0128, 2019.

Zhao, Lixin. "Adaptive Fast PU Partition Mode Decision Algorithm for HEVC," Thesis submitted lo Xidian University, Nov. 2014.

Zhang et al., "History-based Motion Vector Prediction in Versatile Video Coding," 2019 Data Compression Conference (DCC) IEEE, 2019, pp. 43-52.

L.M. Nevdyaev, "Telecommunication Technologies, English-Russian Explanatory Dictionary and Reference Book," Communications and Business, Moscow, 2002, p. 44 & p. 431.

"Stream. A continuous sequence of data transmitted over a channel or communication line" ISO/IEC 2382-1 terms and definitions, Translated from English and commented by L. V. Shutkin, Nov. 25, 2005, All-Russian Research Institute of Computer Engineering and Informatization.

Bross et al. "Versatile Video Coding (Draft 3)," Joint Video Experts Team (JVET)of ITU-T SG 16 WP 3 and ISO/IEC JTC 1/SC 29/WG 1112th Meeting: Macao, CN, Oct. 3-12, 2018, document JVET-L1001, 2018. sections 7.4.5.8, 8.4.2.10, 8.4.2.11, 8.4.2.15, 8.4.7.

Chiang et al. "CE10.1: Combined and Multi-Hypothesis Prediction," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0257, 2018.

Document: JVET-N0373, Lee, H., et al., "Non-CE4: HMVP unification between the Merge and MVP list," Joint Video Experts Team (JVET) of ITU-T SG16 WP3 and ISO/IEC JTC 1/SC 29/WG 11, 14th Meeting: Geneva, Mar. 19-27, 2019, 6 pages.

Document: JVET-J0023-v1, Blaser, M., et al., "Description of SDR and 360° video coding technology proposal by RWTH Aachen

(56) References Cited

OTHER PUBLICATIONS

University," Joint Video Experts Team (JVET) of ITU-T SG 16WP 3 and ISO/IEC JTC 1/SC 29/WG 11 10th Meeting: San Diego, US, Apr. 10-20, 2018, 30 pages.
Document: JVET-N0417-v2, Hu, N., et al., "Simplified luma dependeant chroma residual scaling of in-loop reshaper," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.
Bross et al. "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K1001, 2018.
https://vcgit.hhi.fraunhofer.de/jvet/VVCSoftware_VTM/tags/VTM-2.1, Aug. 16, 2021.
Information Technology-High efficiency coding and media delivery in heterogeneous environments-Part 2: "High Efficiency Video Coding" ISO/IEC JTC 1/SC 29/WG 11 N 17661, ISO/IEC DIS 23008-2_201x (4th Ed.) (Apr. 2018).
Rosewarne C et al. "High Efficiency Video Coding (HEVC) Test Model 16 {HM16} Improved Encoder Description Update 7," Joint Collaborative Team on Video Coding (JCT-VC) of ITU-T SG.16 WP3 and ISO/IEC JTC1/SC29/WG11, 25th Meeting, Chengdu, CN, Oct. 14-21, 2016, document JCTVC-Y1002, 2016.
Chen et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
JEM-7.0: https://jvet.hhi.fraunhofer.de/svn/svn_HMJEMSoftware/tags/ HM-16.6-JEM-7.0, Aug. 16, 2021.
Akula et al. "Description of SOR, HOR and 360 degrees Video Coding Technology Proposal Considering Mobile application Scenario by Samsung, Huawei, GoPro, and HiSilicon," buJoint Video Exploration Team (JVET) of ITU-T S, G 16 WP 3 and ISO/IEC JTC 1/SC 29/WG 11, 1oth Meeting, San Diego, US, Apr. 10-20, 2018, document JVET-J0024, 2010.
Han et al. "CE4.1.3: Affine Motion Compensation Prediction," Joint Video Exploration Team (JVET) of ITU-T SG 16 WP 3 and ISO/IEC JTC 1/SC 29/WG 11, 11th Meeting: Ljubljana, SI,.Jul. 10-18, 2018,document JVET-K0337, 2018.
Chen et al. "CE4: Common Base for Affine Merge Mode (Test 4.2.1)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0366, 2018.
Sullivan et al., "Overview of the High Efficiency Video Coding (HEVC) Standard", IEEE Transactions on Circuits and Systems for Video Technology, Dec. 2012, 22(12):1649-1668.
Luthra et al., "Overview of the H.264/AVC video coding standard", Proceedings of SPIE vol. 5203 Applications of Digital Image Processing XXVI., 2003.
Tu-T H.265 "High efficiency video coding" Series H: Audiovisual and Multimedia Systems nfrastructure of audiovisual services—Coding of moving video, Telecommunication Standardization Sector of ITU, Available at address: https://www.itu.int/rec/T-REC-H. 265 {Nov. 2019).
Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117rl, 2016.

Chen et al. "Description of SOR, HOR and 360 degree Video Coding Technology Proposal by Qualcomm and Technicolor- low and high complexity versions," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0021, 2018.
Su et al. "CE4.4.1: Generalized Bi-Prediction for Inter Coding," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K0248, 2018.
Zhou et al. "Spatial-Temporal Merge Mode (Non Subblock STMVP)," Joint Video Exploration Team (JVET) of ITU-T SG 16 WP 3 and ISO/IEC JTC 1/SC 29/WG 11, 11th Meeting, Ljubljana, SI, Jul. 10-18, 2018, document JVET-K0532_r2, 2018.
Zhang et al. "CE4.2.14: Planar Motion Vector Prediction," Joint Video Experts Team (JVET) of ITU-T SG 16 WP 3 and ISO/IEC JTC 1/SC 29/WG 11, 11th Meeting: Ljubljana, SI, Jul. 10-18, 2018, Document JVET-K0135, 2018.
Hsiao et al. "CE4.2.8: Merge Mode Enhancement," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K0245, 2018.
Document: JVET-M1001-v7, Bross, B., et al., "Versatile Video Coding (Draft 4)," Joint Video Experts Team (JVET) of ITU-T SG 16 WP 3 and ISO/IEC JTC 1/SC 29/WG 11, 13th Meeting: Marrakech, MA, Jan. 9-18, 2019, 292 pages.
International Search Report and Written Opinion from International Patent Application No. PCT/CN2019/115451 dated Jan. 23, 2020 (11 pages).
International Search Report and Written Opinion from International Patent Application No. PCT/CN2019/115453 dated Feb. 1, 2020 (10 pages).
International Search Report and Written Opinion from International Patent Application No. PCT/CN2019/115454 dated Jan. 6, 2020 (9 pages).
International Search Report and Written Opinion from International Patent Application No. PCT/CN2020/089204 dated Jul. 30, 2020 (11 pages).
Extended European Search Report from European Application No. 19880847.9 dated Oct. 15, 2021.
Non-Final Office Action from U.S. Appl. No. 17/019,581 dated Nov. 20, 2020.
Final Office Action from U.S. Appl. No. 17/019,581 dated Mar. 8, 2021.
Non-Final Office Action dated Sep. 21, 2023, 25 pages, U.S. Appl. No. 17/520,570, filed Nov. 5, 2021.
Corrected Notice of Allowability dated May 30, 2023, 14 pages, U.S. Appl. No. 17/403,750, filed Aug. 16, 2021.
Non-Final Office Action dated Sep. 16, 2022, 16 pages, U.S. Appl. No. 17/403,750, filed Aug. 16, 2021.
Notice of Allowance dated Feb. 23, 2023, 18 pages, U.S. Appl. No. 17/403,750, filed Aug. 16, 2021.
Non-Final Office Actin from U.S. Appl. No. 17/520,570 dated Jul. 1, 2024, 13 pages.
Final Office Action from U.S. Appl. No. 17/520,570 dated Feb. 28, 2024, 15 pages.

* cited by examiner

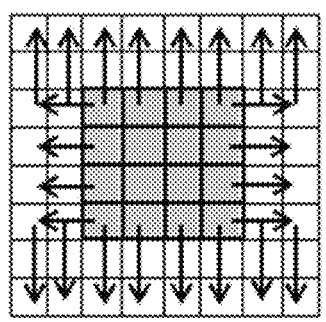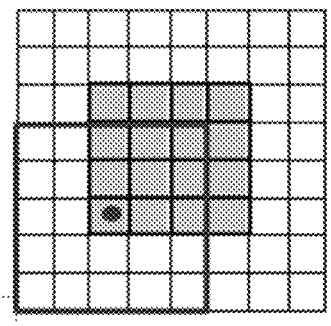
FIG. 27

TABLE MAINTENANCE FOR HMVP CANDIDATE STORAGE

CROSS-REFERENCE TO RELATED APPLICATIONS

This application is a continuation of U.S. patent application Ser. No. 17/403,750, filed on Aug. 16, 2021, which is a continuation of U.S. patent application Ser. No. 17/019,581, filed on Sep. 14, 2020, which is a continuation of International Patent Application No. PCT/CN2019/115453, filed on Nov. 4, 2019, which claims the priority to and benefits of International Patent Application No. PCT/CN2018/113716, filed on Nov. 2, 2018 and International Patent Application No. PCT/CN2019/086174, filed on May 9, 2019. All of the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for in which geometry partitions with history based motion vector prediction (HMVP) is used.

In one example aspect, a method of processing video is disclosed. The method includes performing a determination, by a processor, that a first video block is intra-coded or non-merge inter-coded; determining, by the processor, a first sub-portion and a second sub-portion for the first video block based on the determination that the first video block is intra-coded or non-merge inter-coded, wherein one or both of the first sub-portion or the second sub-portion are non-rectangular and non-square portions of the first video block; and performing further processing of the first video block using the first sub-portion and the second sub-portion.

In another example aspect, a method of processing video includes performing a determination, by a processor, that a first video block is intra-coded or non-merge inter-coded; determining, by the processor, a first sub-portion and a second sub-portion for the first video block, wherein one or both of the first sub-portion or the second sub-portion are non-rectangular and non-square portions of the first video block; and performing further processing of the first video block using the first sub-portion and the second sub-portion, wherein at least one sub-portion is merge or non-merge inter coded and using a current image as a reference image.

In another example aspect, a method of processing video includes performing a determination, by a processor, that a first video block is intra-coded or non-merge inter-coded; determining, by the processor, a first sub-portion and a second sub-portion for the first video block, wherein one or both of the first sub-portion or the second sub-portion are non-rectangular and non-square portions of the first video block; and performing further processing of the first video block using the first sub-portion and the second sub-portion, wherein performing further processing of the first video block using the first sub-portion and the second sub-portion is based on inter or intra coded information of non-adjacent spatial video blocks in relation to the first video block.

In another example aspect, a method of processing video includes performing a determination that a first video block is coded with triangular portion mode (TPM) using a triangular prediction portion of the first video block and that a second video block is coded using non-TPM using a non-triangular prediction portion of the second video block; performing further processing of the first video block and the second video block using stored HMVP candidates and storing HMVP candidates associated with the first video block and the second video block.

In another example aspect, a method of processing video includes performing a determination, by a processor, that a first video block includes prediction portions that are non-rectangular and non-square portions of the first video block; identifying an HMVP candidate; adding one or more motion candidates derived from the HMVP candidate to a merge list associated with video blocks that include prediction portions that are non-rectangular and non-square; and performing further processing of the first video block using the merge list.

In another example aspect, a method for processing video includes: determining, during a conversion between a current block of visual media data and a corresponding coded representation of the visual media data, multiple sub-portions for the current block; determining intra prediction information of the multiple sub-portions; performing the conversion of the current block using the intra prediction information of the multiple sub-portions; and wherein the current block is intra-coded, and at least one of the multiple sub-portions is a non-rectangular and non-square sub-portion.

In another example aspect, a method for processing video includes: determining, during a conversion between a current block of visual media data and a corresponding coded representation of the visual media data, multiple sub-portions for the current block; determining motion information of the multiple sub-portions; performing the conversion of the current block using the motion information of the multiple sub-portions; and wherein the current block is non-merge inter-coded, and at least one of the multiple sub-portions is a non-rectangular and non-square sub-portion.

In another example aspect, a method of video processing includes: performing a conversion between a current block of visual media data and a corresponding coded representation of the visual media data, wherein the current block is partitioned into multiple sub-portions according to a splitting pattern in which a first sub-portion has a non-rectangular, non-square shape; processing a first sub-portion with intra coding mode; and processing a second sub-portion with inter coding mode.

In another example aspect, a method of video processing includes: performing a conversion between a current block of visual media data and a corresponding coded representation of the visual media data, wherein the current block is partitioned into multiple sub-portions according to a splitting pattern in which a first sub-portion has a non-rectangular, non-square shape; wherein the at least one of the multiple sub-portions is merge or non-merge inter coded and uses a current picture as a reference picture.

In another example aspect, a method of video processing includes: performing a conversion between a current block of visual media data and a corresponding coded representation of the visual media data, wherein the current block is partitioned into multiple sub-portions according to a splitting pattern in which a first prediction partition has a non-rectangular, non-square shape; and performing the conversion using inter or intra coded information of one or more non-adjacent spatial blocks.

In another example aspect, a method for processing video includes: determining, during a conversion between a first block of visual media data and a corresponding coded representation of the visual media data, the first block being coded with geometry partition mode; determining, based on at least one table storing history based motion vector prediction (HMVP) candidates which include motion information based on previously coded blocks, motion information of at least one sub-portion of the first block; performing the conversion of the first block using the determined motion information.

In another example aspect, a method for processing video includes: determining, during a conversion between a first block of visual media data and a corresponding coded representation of the visual media data, the first block being coded with geometry partition mode; determining motion information of at least one sub-portion of the first block; performing the conversion of the first block using the motion information of the at least one sub-portion; wherein determining motion information of at least one sub-portion comprises using at least one history based motion vector prediction (HMVP) candidate which includes motion information based on a previously coded block to construct a motion candidate list and determining the motion information from the motion candidate list.

In another example aspect, the above-described method may be implemented by a video encoder apparatus that comprises a processor.

In another example aspect, the above-described method may be implemented by a video decoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 7 shows an example of a combined bi-predictive merge candidate.

FIG. 16 shows an example of motion vector storage.

FIG. 27 shows an example of BIO w/o block extension: a) access positions outside of the block; b) padding is used in order to avoid extra memory access and calculation.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. SUMMARY

This patent document is related to video coding technologies. Specifically, it is related to motion vector coding under geometry partition in video coding. It may be applied to the existing video coding standard like HEVC, or the standard (Versatile Video Coding) to be finalized. It may be also applicable to future video coding standards or video codec.

2. BACKGROUND

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM. In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

Figure 30:
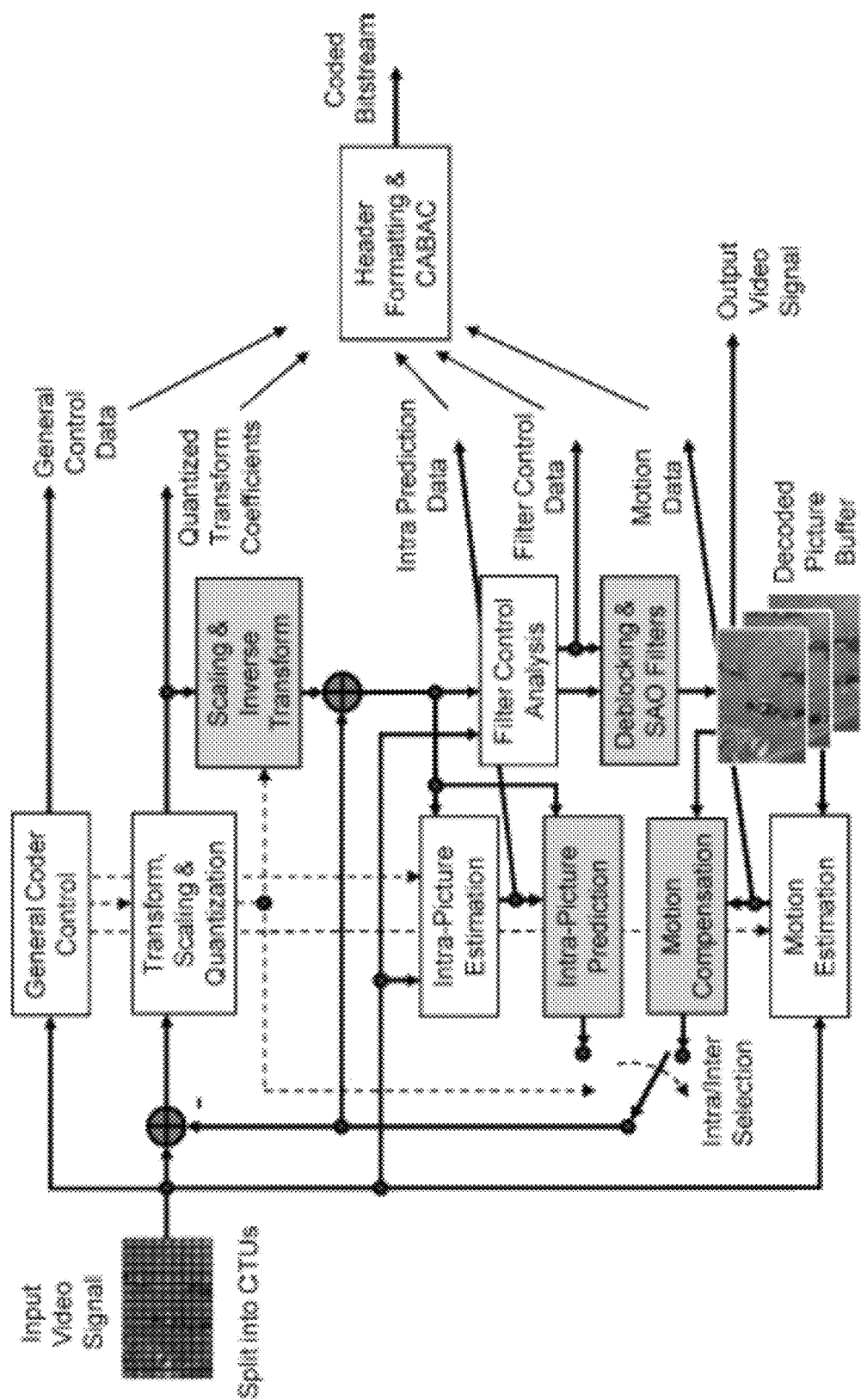
FIG. 30 shows a block diagram of an example implementation of a video encoder.

FIG. 30 is a block diagram of an example implementation of a video encoder. FIG. 30 shows that the encoder implementation has a feedback path built in in which the video encoder also performs video decoding functionality (reconstructing compressed representation of video data for use in encoding of next video data).

2.1 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1. Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode 2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

Figure 1:
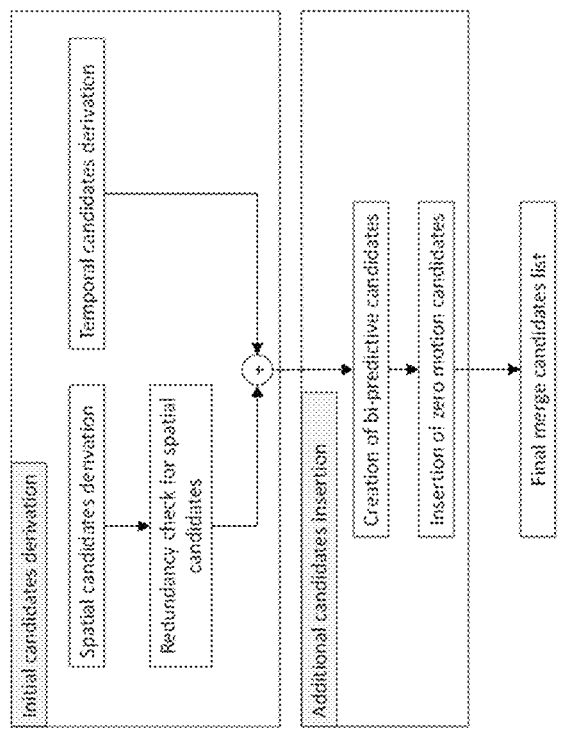
FIG. 1 shows an example of a derivation process for merge candidates list construction.

FIG. 1 shows an example of a derivation process for merge candidates list construction.

2.1.2.2. Spatial Candidates Derivation

Figure 2:
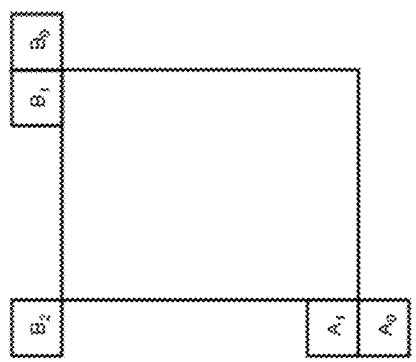
FIG. 2 shows an example of positions of spatial merge candidates.
Figure 3:
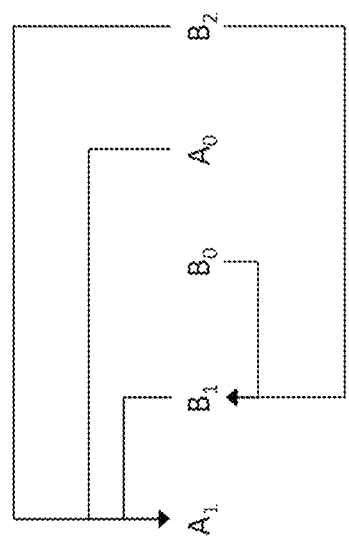
FIG. 3 shows an example of candidate pairs considered for redundancy check of spatial merge candidates.
Figure 4:
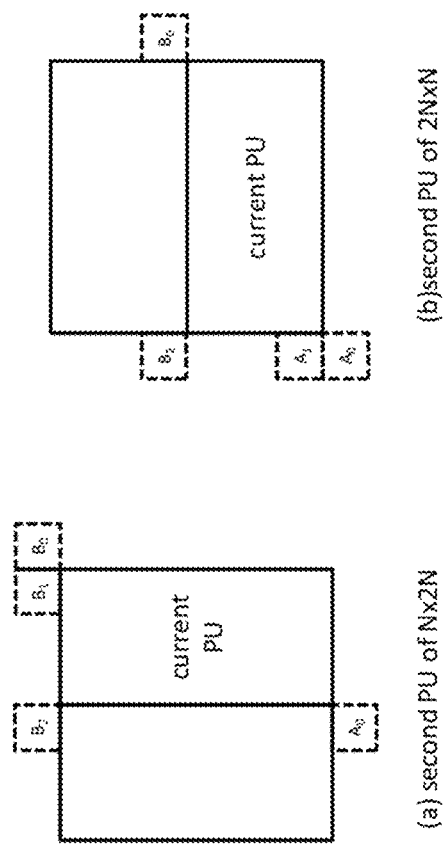
FIG. 4 shows an example of positions for the second PU of N×2N and 2N×N partitions.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

FIG. 2 shows an example of positions of spatial merge candidates.

FIG. 3 shows an example of candidate pairs considered for redundancy check of spatial merge candidates.

FIG. 4 shows an example of positions for the second PU of N×2N and 2N×N partitions.

2.1.2.3. Temporal Candidates Derivations

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 5:
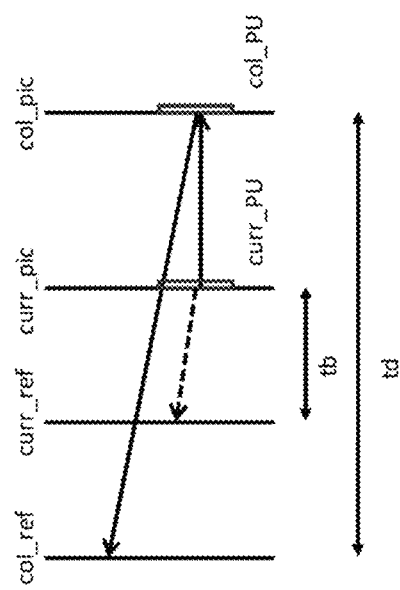
FIG. 5 shows an example of motion vector scaling for a temporal merge candidate.

FIG. 5 shows an example of of motion vector scaling for temporal merge candidate.

Figure 6:
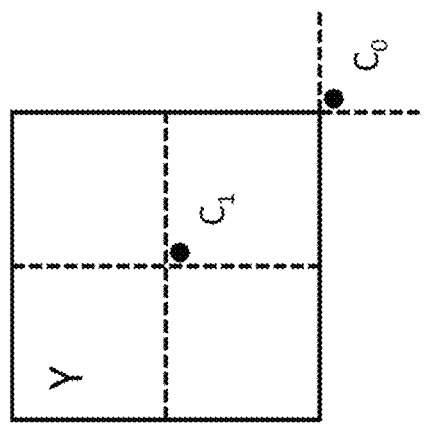
FIG. 6 shows an example of candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU row, position $C_1$ is used. Otherwise, position $C_0$ is used in the derivation of the temporal merge candidate.

FIG. 6 shows an example of candidate positions for temporal merge candidate, C0 and C1.

2.1.2.4. Additional Candidates Insertion

Figure 7:
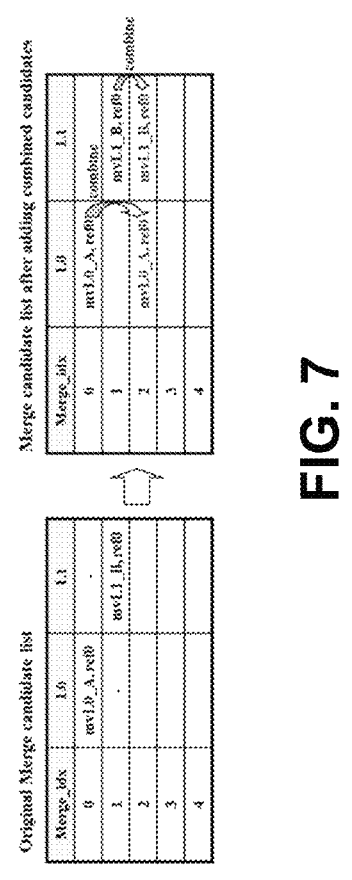

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

FIG. 7 shows an example of combined bi-predictive merge candidate.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.1.2.5. Motion Estimation Regions for Parallel Processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log 2_parallel_merge_level_minus2" syntax element. When a MER is defined, merge candidates falling in the same region are marked as unavailable and therefore not considered in the list construction.

2.1.3. AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
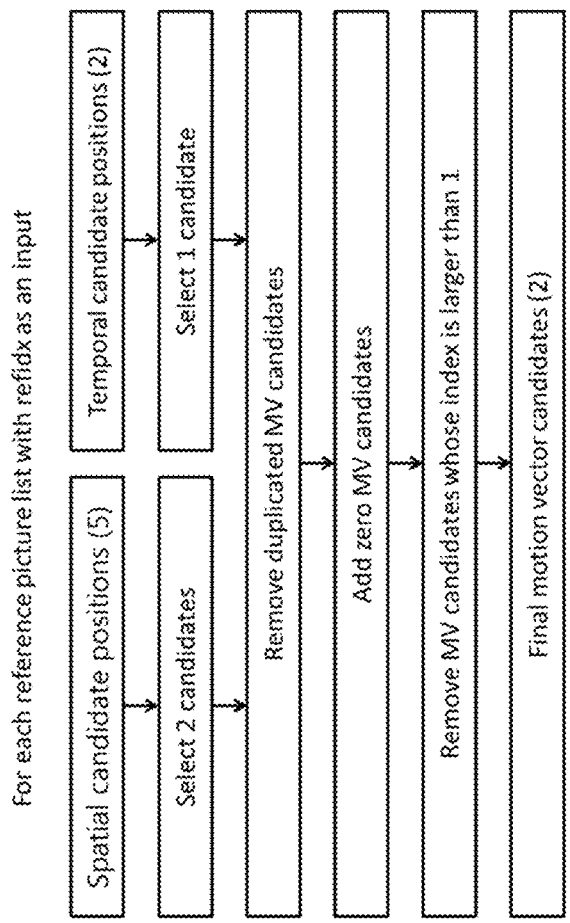
FIG. 8 shows an example of a derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2. Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as A0, A1, and scaled A0, scaled A1. The order of derivation for the above side of the current PU is defined as B0, B1, B2, scaled B0, scaled B1, scaled B2. For each side there are therefore four cases that can be used as motion vector candidate, with two cases not required to use spatial scaling, and two cases where spatial scaling is used. The four different cases are summarized as follows.

No Spatial Scaling
  (1) Same reference picture list, and same reference picture index (same POC)
  (2) Different reference picture list, but same reference picture (same POC)

Spatial Scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
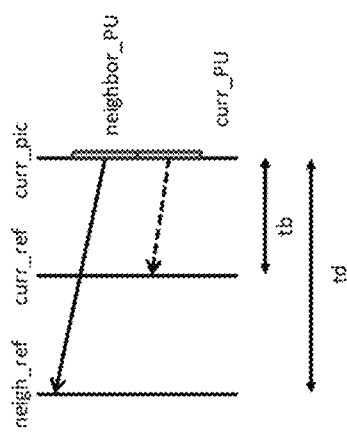
FIG. 9 shows an example of motion vector scaling for a spatial motion vector candidate.

FIG. 9 shows an example of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3. Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2. New Inter Prediction Methods in JEM 2.2.1. Sub-CU Based Motion Vector Prediction In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

Figure 10:
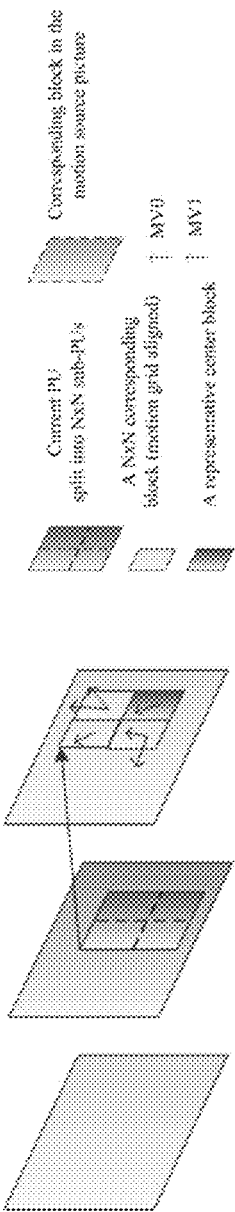
FIG. 10 shows an example of ATMVP motion prediction for a CU.

FIG. 10 shows an example ATMVP motion prediction for a CU.

2.2.1.1. Alternative Temporal Motion Vector Prediction

In the alternative temporal motion vector prediction (ATMVP) method, the motion vectors temporal motion vector prediction (TMVP) is modified by fetching multiple sets of motion information (including motion vectors and reference indices) from blocks smaller than the current CU. The sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector MVx (the motion vector corresponding to reference picture list X) to predict motion vector MVy (with X being equal to 0 or 1 and Y being equal to 1−X) for each sub-CU.

2.2.1.2. Spatial-Temporal Motion Vector Prediction (STMVP)

Figure 11:
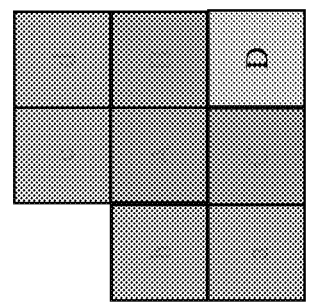
FIG. 11 shows an example of one CU with four sub-blocks (A-D) and its neighbouring blocks (a-d).

In this method, the motion vectors of the sub-CUs are derived recursively, following raster scan order. FIG. 11 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

2.2.1.3. Sub-CU Motion Prediction Mode Signaling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index is context coded by CABAC. While in HEVC, only the first bin is context coded and the remaining bins are context by-pass coded.

2.2.2. Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Figure 12:
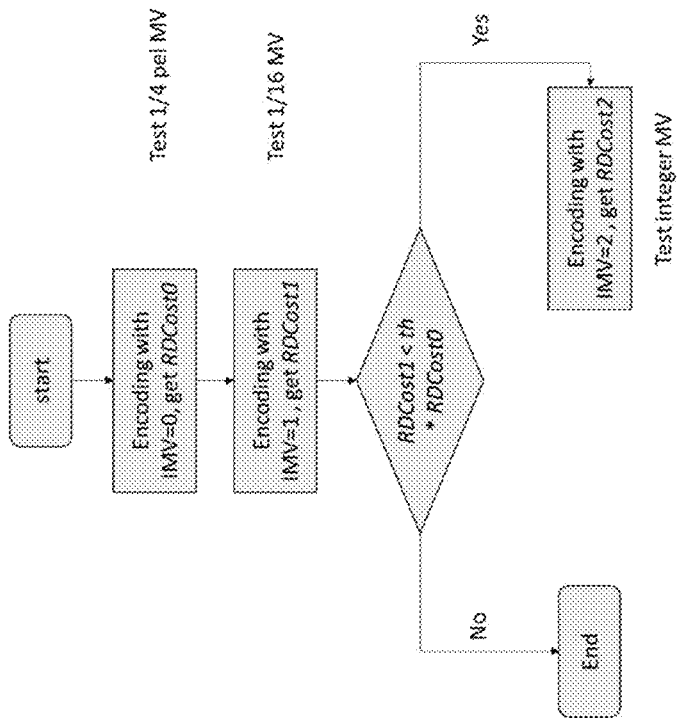
FIG. 12 shows an example of a flowchart of encoding with different MV precision.

The encoding process is shown in FIG. 12. First, ¼ pel MV is tested and the RD cost is calculated and denoted as RDCost0, then integer MV is tested and the RD cost is denoted as RDCost1. If RDCost1<th*RDCost0 (wherein th is a positive value), then 4-pel MV is tested; otherwise, 4-pel MV is skipped. Basically, motion information and RD cost etc. are already known for ¼ pel MV when checking integer or 4-pel MV, which can be reused to speed up the encoding process of integer or 4-pel MV.

2.2.3. Triangular Prediction Mode

Figure 13:
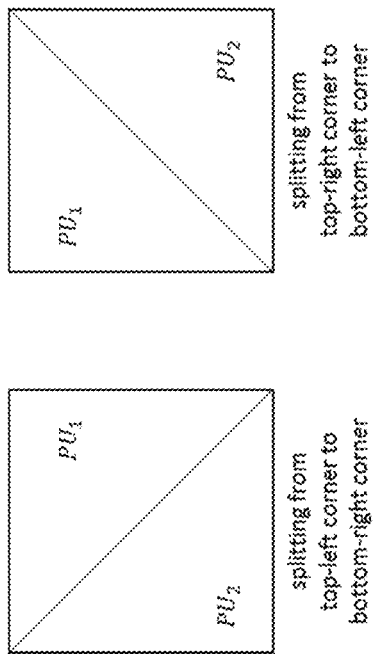
FIG. 13 shows examples of splitting a CU into two triangular prediction units (two partition types).

The concept of the triangular prediction mode (TPM) is to introduce a new triangular partition for motion compensated prediction. As shown in FIG. 13, it splits a CU into two triangular prediction units, in either diagonal or inverse diagonal direction. Each triangular prediction unit in the CU is inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to skip and merge modes.

2.2.3.1 Uni-Prediction Candidate List for TPM

Figure 14:
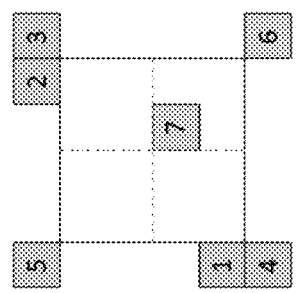
FIG. 14 shows an example of a position of neighboring blocks.

The uni-prediction candidate list consists of five uni-prediction motion vector candidates. It is derived from seven neighboring blocks including five spatial neighboring blocks (1 to 5) and two temporal co-located blocks (6 to 7), as shown in FIG. 14. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list.

More specifically, the following steps are involved:

Obtain motion candidates from A1, B1, B0, A0, B2, Col and Col2 (corresponding to block 1-7 in FIG. 14) without any pruning operations.

Set variable numCurrMergeCand=0

For each motion candidates derived from A1, B1, B0, A0, B2, Col and Col2 and numCurrMergeCand is less than 5, if the motion candidate is uni-prediction (either from List 0 or List 1), it is added to the merge list with numCurrMergeCand increased by 1. Such added motion candidates is named 'originally uni-predicted candidate'.

Full pruning is applied.

For each motion candidates derived from A1, B1, B0, A0, B2, Col and Col2 and numCurrMergeCand is less than 5, if the motion candidate is bi-prediction, the motion information from List 0 is added to the merge list (that is, modified to be uni-prediction from List 0) and numCurrMergeCand increased by 1. Such added motion candidates is named 'Truncated List0-predicted candidate'.

Full pruning is applied.

For each motion candidates derived from A1, B1, B0, A0, B2, Col and Col2 and numCurrMergeCand is less than 5, if the motion candidate is bi-prediction, the motion information from List 1 is added to the merge list (that is, modified to be uni-prediction from List 1) and numCurrMergeCand increased by 1. Such added motion candidates is named 'Truncated List1-predicted candidate'.

Full pruning is applied.

For each motion candidates derived from A1, B1, B0, A0, B2, Col and Col2 and numCurrMergeCand is less than 5, if the motion candidate is bi-prediction, If List 0 reference picture's slice QP is smaller than List 1 reference picture's slice QP, the motion information of List 1 is firstly scaled to List 0 reference picture, and the average of the two MVs (one is from original List 0, and the other is the scaled MV from List 1) is added to the merge list, that is averaged uni-prediction from List 0 motion candidate and numCurrMergeCand increased by 1.

Otherwise, the motion information of List 0 is firstly scaled to List 1 reference picture, and the average of the two MVs (one is from original List 1, and the other is the scaled MV from List 0) is added to the merge list, that is averaged uni-prediction from List 1 motion candidate and numCurrMergeCand increased by 1.

Full pruning is applied.

If numCurrMergeCand is less than 5, zero motion vector candidates are added.

2.2.3.2. Adaptive Weighting Process

After predicting each triangular prediction unit, an adaptive weighting process is applied to the diagonal edge between the two triangular prediction units to derive the final prediction for the whole CU. Two weighting factor groups are defined as follows:

1st weighting factor group: {7/8, 6/8, 4/8, 2/8, 1/8} and {7/8, 4/8, 1/8} are used for the luminance and the chrominance samples, respectively;

2nd weighting factor group: {7/8, 6/8, 5/8, 4/8, 3/8, 2/8, 1/8} and {6/8, 4/8, 2/8} are used for the luminance and the chrominance samples, respectively.

Figure 15:
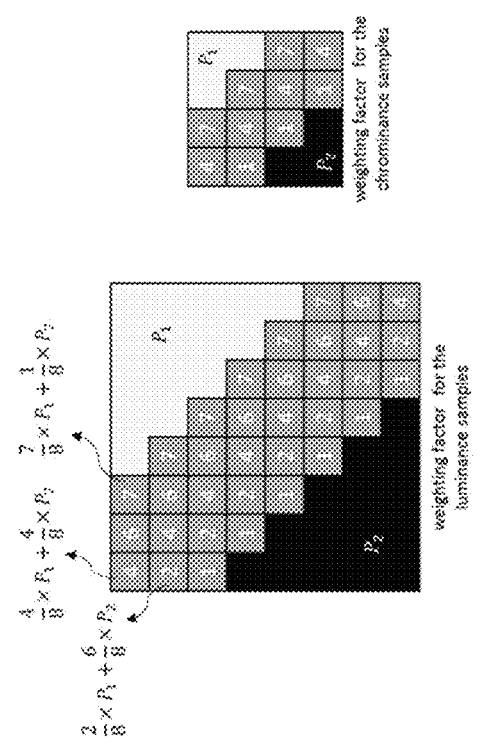
FIG. 15 shows an example of a CU applying the 1st weighting factor group.
Figure 17:
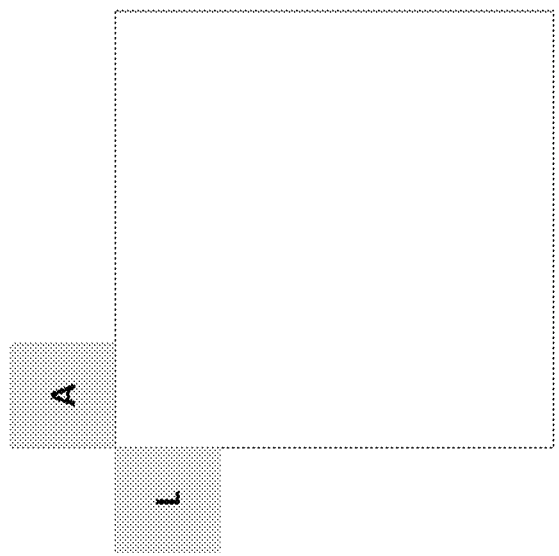
FIG. 17 shows an example of neighboring blocks (A and L) used for context selection in TPM flag coding.

Weighting factor group is selected based on the comparison of the motion vectors of two triangular prediction units. The 2nd weighting factor group is used when the reference pictures of the two triangular prediction units are different from each other or their motion vector difference is larger than 16 pixels. Otherwise, the 1st weighting factor group is used. An example is shown in FIG. 15.

2.2.3.3. Motion Vector Storage

Figure 16:
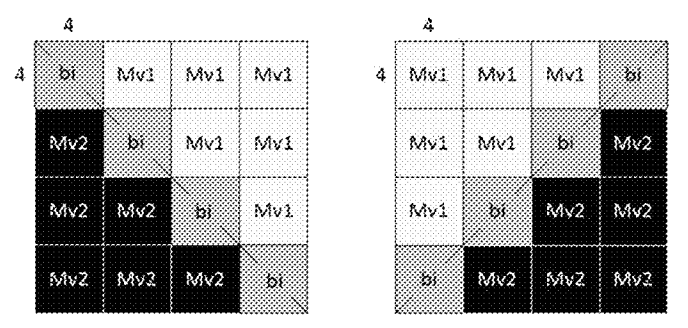

The motion vectors (Mv1 and Mv2 in FIG. 16) of the triangular prediction units are stored in 4×4 grids. For each 4×4 grid, either uni-prediction or bi-prediction motion vector is stored depending on the position of the 4×4 grid in the CU. As shown in FIG. 16, uni-prediction motion vector, either Mv1 or Mv2, is stored for the 4×4 grid located in the non-weighted area (that is, not located at the diagonal edge). On the other hand, a bi-prediction motion vector is stored for the 4×4 grid located in the weighted area. The bi-prediction motion vector is derived from Mv1 and Mv2 according to the following rules:

In the case that Mv1 and Mv2 have motion vector from different directions (L0 or L1), Mv1 and Mv2 are simply combined to form the bi-prediction motion vector.

In the case that both Mv1 and Mv2 are from the same L0 (or L1) direction,

If the reference picture of Mv2 is the same as a picture in the L1 (or L0) reference picture list, Mv2 is scaled to the picture. Mv1 and the scaled Mv2 are combined to form the bi-prediction motion vector.

If the reference picture of Mv1 is the same as a picture in the L1 (or L0) reference picture list, Mv1 is scaled to the picture. The scaled Mv1 and Mv2 are combined to form the bi-prediction motion vector.

Otherwise, only Mv1 is stored for the weighted area.

2.2.3.4. Signaling of Triangular Prediction Mode (TPM)

One bit flag to indicate whether TPM is used may be firstly signaled. Afterwards, the indications of two splitting patterns (as depicted in FIG. 13), and selected merge indices for each of the two partitions are further signaled.

2.2.3.4.1 Signaling of TPM Flag

Let's denote one luma block's width and height by W and H, respectively. If W*H<64, triangular prediction mode is disabled.

When one block is coded with affine mode, triangular prediction mode is also disabled.

When one block is coded with merge mode, one bit flag may be signaled to indicate whether the triangular prediction mode is enabled or disabled for the block.

The flag is coded with 3 contexts, based on the following equation:

Ctx index=((left block $L$ available && $L$ is coded with TPM?)1:0)

+((Above block A available && A is coded with TPM?) 1:0);

2.2.3.4.2. Signaling of an indication of two splitting patterns (as depicted in FIG. 13), and selected merge indices for each of the two partitions It is noted that splitting patterns, merge indices of two partitions are jointly coded. It is restricted that the two partitions couldn't use the same reference index. Therefore, there are 2 (splitting patterns)*N (maximum number of merge candidates)*(N−1) possibilities wherein N is set to 5. One indication is coded and the mapping between the partition type, two merge indices are derived from the array defined below:

const uint8_t g_TriangleCombination[TRIANGLE_MAX_NUM_CANDS][3]=
{0, 1, 0}, {1, 0, 1}, {1, 0, 2}, {0, 0, 1}, {0, 2, 0},
{1, 0, 3}, {1, 0, 4}, {1, 1, 0}, {0, 3, 0}, {0, 4, 0},
{0, 0, 2}, {0, 1, 2}, {1, 1, 2}, {0, 0, 4}, {0, 0, 3},
{0, 1, 3}, {0, 1, 4}, {1, 1, 4}, {1, 1, 3}, {1, 2, 1},
{1, 2, 0}, {0, 2, 1}, {0, 4, 3}, {1, 3, 0}, {1, 3, 2},
{1, 3, 4}, {1, 4, 0}, {1, 3, 1}, {1, 2, 3}, {1, 4, 1},
{0, 4, 1}, {0, 2, 3}, {1, 4, 2}, {0, 3, 2}, {1, 4, 3},
{0, 3, 1}, {0, 2, 4}, {1, 2, 4}, {0, 4, 2}, {0, 3, 4}};

Partition type (45 degree or 135 degree)=g_TriangleCombination[signaled indication] [0];

Merge index of candidate A=g_TriangleCombination[signaled indication][1];

Merge index of candidate B=g_TriangleCombination[signaled indication][2];

Once the two motion candidates A and B are derived, the two partitions' (PU1 and PU2) motion information could be set either from A or B. Whether PU1 uses the motion information of merge candidate A or B is dependent on the prediction directions of the two motion candidates. Table 1Table 1 shows the relationship between two derived motion candidates A and B, with the two partitions.

TABLE 1

Derivation of partitions' motion information from derived two merge candidates (A, B)

| Prediction direction of A | Prediction direction of B | PU1's motion information | PU2's motion information |
|---|---|---|---|
| L0 | L0 | A (L0) | B (L0) |
| L1 | L1 | B (L1) | A (L1) |

TABLE 1-continued

Derivation of partitions' motion information
from derived two merge candidates (A, B)

| Prediction direction of A | Prediction direction of B | PU1's motion information | PU2's motion information |
|---|---|---|---|
| L0 | L1 | A (L0) | B (L1) |
| L1 | L0 | B (L0) | A (L1) |

2.2.3.4.3. Entropy Coding of the Indication (Denoted by Merge_Triangle_Idx)

merge triangle idx is within the range [0, 39], inclusively. K-th order Exponential Golomb (EG) code is used for binarization of merge_triangle_idx wherein K is set to 1.

K-th order EG

To encode larger numbers in fewer bits (at the expense of using more bits to encode smaller numbers), this can be generalized using a nonnegative integer parameter k. To encode a nonnegative integer x in an order-k exp-Golomb code:

Encode $\lfloor x/2^i \rfloor$ using order-0 exp-Golomb code describe above, then Encode x mod $2^k$ in binary

TABLE 2

Exp-Golomb-k coding examples

| x | k = 0 | k = 1 | k = 2 |
|---|---|---|---|
| 0 | 1 | 10 | 100 |
| 1 | 010 | 11 | 101 |
| 2 | 011 | 0100 | 110 |
| 3 | 00100 | 0101 | 111 |
| 4 | 00101 | 0110 | 01000 |
| 5 | 00110 | 0111 | 01001 |
| 6 | 00111 | 001000 | 01010 |
| 7 | 0001000 | 001001 | 01011 |
| 8 | 0001001 | 001010 | 01100 |
| 9 | 0001010 | 001011 | 01101 |
| 10 | 0001011 | 001100 | 01110 |
| 11 | 0001100 | 001101 | 01111 |
| 12 | 0001101 | 001110 | 0010000 |
| 13 | 0001110 | 001111 | 0010001 |
| 14 | 0001111 | 00010000 | 0010010 |
| 15 | 000010000 | 00010001 | 0010011 |
| 16 | 000010001 | 00010010 | 0010100 |
| 17 | 000010010 | 00010011 | 0010101 |
| 18 | 000010011 | 00010100 | 0010110 |
| 19 | 000010100 | 00010101 | 0010111 |

2.2.4. Overlapped Block Motion Compensation

Figure 18:
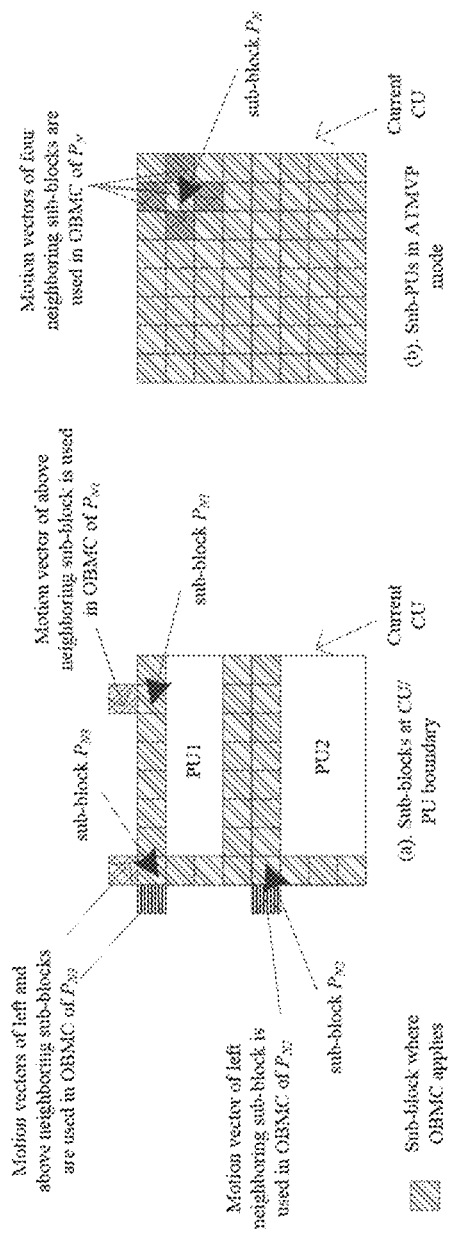
FIG. 18 shows an example of sub-blocks where OBMC applies.

Overlapped Block Motion Compensation (OBMC) has previously been used in H.263. In the JEM, unlike in H.263, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, a MC block is corresponding to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as illustrated in FIG. 18.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighbouring sub-block is denoted as $P_N$, with N indicating an index for the neighbouring above, below, left and right sub-blocks and prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every sample of $P_N$ is added to the same sample in $P_C$, i.e., four rows/columns of $P_N$ are added to $P_C$. The weighting factors {¼, ⅛, 1/16, 1/32} are used for $P_N$ and the weighting factors {¾, ⅞, 15/16, 31/32} are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors {¼, ⅛} are used for $P_N$ and weighting factors {¾, ⅞} are used for $P_C$. For $P_N$ generated based on motion vectors of vertically (horizontally) neighbouring sub-block, samples in the same row (column) of $P_N$ are added to $P_C$ with a same weighting factor.

In the JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighbouring block and the left neighbouring block is used to compensate the top and left boundaries of the original signal of the current CU, and then the normal motion estimation process is applied.

2.2.5. Local Illumination Compensation

Local Illumination Compensation (LIC) is based on a linear model for illumination changes, using a scaling factor a and an offset b. And it is enabled or disabled adaptively for each inter-mode coded coding unit (CU).

Figure 19:
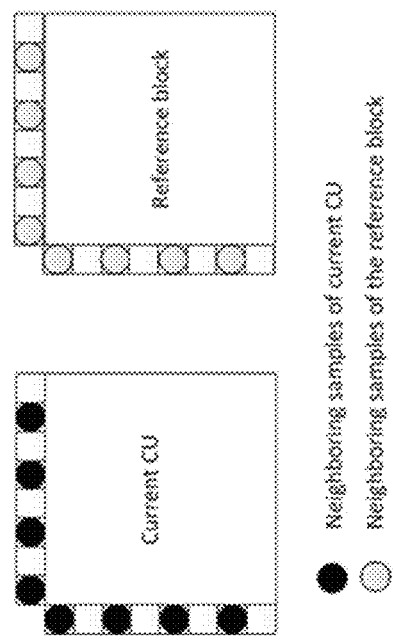
FIG. 19 shows an example of neighboring samples used for deriving IC parameters.

When LIC applies for a CU, a least square error method is employed to derive the parameters a and b by using the neighbouring samples of the current CU and their corresponding reference samples. More specifically, as illustrated in FIG. 19, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighbouring blocks, in a way similar to motion information copy in merge mode; otherwise, an LIC flag is signalled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.2.6. Affine Motion Compensation Prediction

Figure 20:
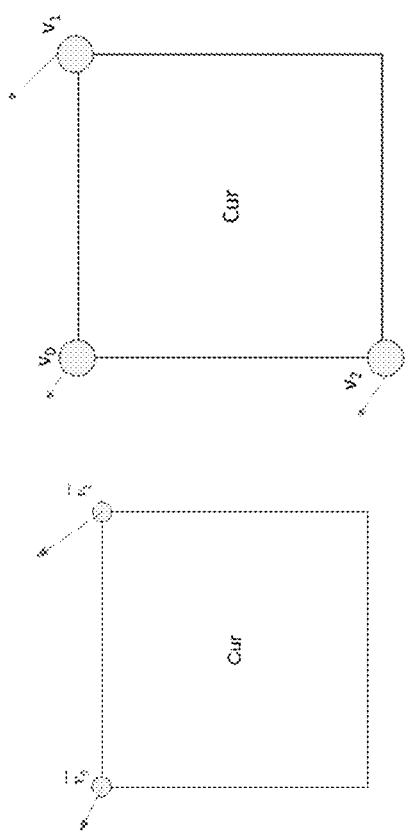
FIG. 20 shows an example of a simplified affine motion model.

In HEVC, only translation motion model is applied for motion compensation prediction (MCP). While in the real world, there are many kinds of motion, e.g. zoom in/out, rotation, perspective motions and he other irregular motions. In the JEM, a simplified affine transform motion compensation prediction is applied. As shown in FIG. 20, the affine motion field of the block is described by two control point motion vectors.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1\text{-}a)$$

For 6-parmaeter affine, $$\begin{cases} v_x = \frac{v_{1x} - v_{0x}}{w}x + \frac{v_{2x} - v_{0x}}{w}y + v_{0x} \\ v_y = \frac{v_{1y} - v_{0y}}{w}x + \frac{v_{2y} - v_{0y}}{w}y + v_{0y} \end{cases} \quad (1\text{-}b)$$

Where $(v_{0x}, v_{0y})$ is motion vector of the top-left corner control point, and $(v_{1x}, v_{1y})$ is motion vector of the top-right corner control point and $(v_{2x}, v_{2y})$ is motion vector of the bottom-left corner control point, (x, y) represents the coordinate of a representative point relative to the top-left sample within current block. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2).

In order to further simplify the motion compensation prediction, sub-block based affine transform prediction is applied. The sub-block size M×N is derived as in Equation 2, where MvPre is the motion vector fraction accuracy (1/16 in JEM), $(v_{2x}, v_{2y})$ is motion vector of the bottom-left control point, calculated according to Equation 1.

$$\begin{cases} M = clip3\left(4, w, \frac{w \times MvPre}{\max(abs(v_{1x} - v_{0x}), abs(v_{1y} - v_{0y}))}\right) \\ N = clip3\left(4, h, \frac{h \times MvPre}{\max(abs(v_{2x} - v_{0x}), abs(v_{2y} - v_{0y}))}\right) \end{cases} \quad (2)$$

After derived by Equation 2, M and N should be adjusted downward if necessary to make it a divisor of w and h, respectively.

Figure 21:
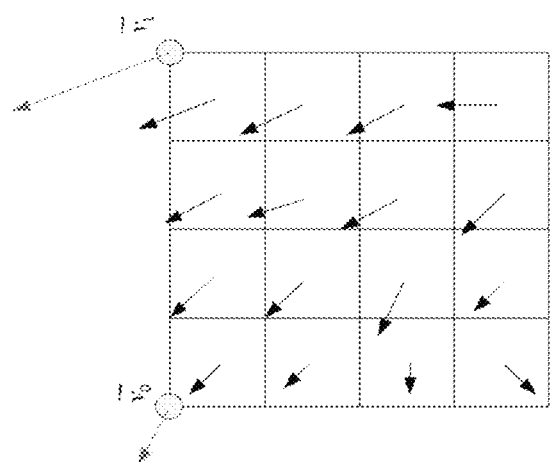
FIG. 21 shows an example of affine MVF per sub-block.

To derive motion vector of each M×N sub-block, the motion vector of the center sample of each sub-block, as shown in FIG. 21, is calculated according to Equation 1, and rounded to 1/16 fraction accuracy. Then the motion compensation interpolation filters mentioned elsewhere herein are applied to generate the prediction of each sub-block with derived motion vector.

After MCP, the high accuracy motion vector of each sub-block is rounded and saved as the same accuracy as the normal motion vector.

2.2.6.1. AF_INTER Mode

Figure 23:
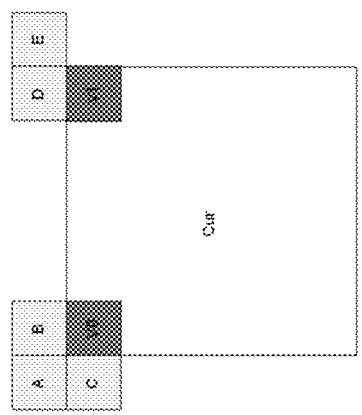
FIG. 23 shows an example of MVP for AF_INTER.

In the JEM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a candidate list with motion vector pair $\{(v_0, v_1)|v_0=\{V_A, V_B, V_C\}, v_1=\{V_D,V_E\}\}$ is constructed using the neighbour blocks. As shown in FIG. 23, $v_0$ is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select $v_1$ from the neighbour block D and E is similar. If the number of candidate list is smaller than 2, the list is padded by the motion vector pair composed by duplicating each of the AMVP candidates. When the candidate list is larger than 2, the candidates are firstly sorted according to the consistency of the neighbouring motion vectors (similarity of the two motion vectors in a pair candidate) and only the first two candidates are kept. An RD cost check is used to determine which motion vector pair candidate is selected as the control point motion vector prediction (CPMVP) of the current CU. And an index indicating the position of the CPMVP in the candidate list is signalled in the bitstream. After the CPMVP of the current affine CU is determined, affine motion estimation is applied and the control point motion vector (CPMV) is found. Then the difference of the CPMV and the CPMVP is signalled in the bitstream.

Figure 22:
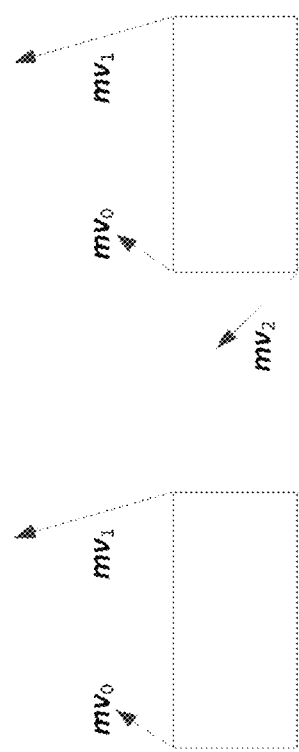
FIG. 22 shows an example of 4-paramenter affine model (a) and 6-parameter affine model (b).

In AF_INTER mode, when 4/6 parameter affine mode is used, 2/3 control points are required, and therefore 2/3 MVD needs to be coded for these control points, as shown in FIG. 22. It is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 22 (*b*). Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.2.6.2. AF_MERGE Mode

Figure 24:
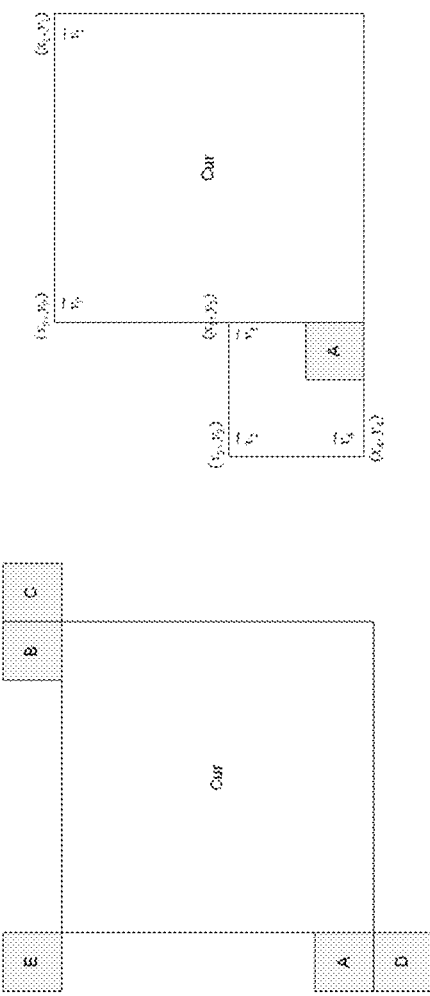
FIG. 24 shows an example of candidates for AF_MERGE.

When a CU is applied in AF_MERGE mode, it gets the first block coded with affine mode from the valid neighbour reconstructed blocks. And the selection order for the candidate block is from left, above, above right, left bottom to above left as shown in FIG. 24 *a*. If the neighbour left bottom block A is coded in affine mode as shown in FIG. 24 *b*, the motion vectors $v_2$, $v_3$ and $v_4$ of the top left corner, above right corner and left bottom corner of the CU which contains the block A are derived. And the motion vector $v_0$ of the top left corner on the current CU is calculated according to $v_2$, $v_3$ and $v_4$. Secondly, the motion vector $v_1$ of the above right of the current CU is calculated.

After the CPMV of the current CU $v_0$ and $v_1$ are derived, according to the simplified affine motion model Equation 1, the MVF of the current CU is generated. In order to identify whether the current CU is coded with AF_MERGE mode, an affine flag is signalled in the bitstream when there is at least one neighbour block is coded in affine mode.

An affine merge candidate list is constructed with following steps:

Insert Inherited Affine Candidates

Figure 25:
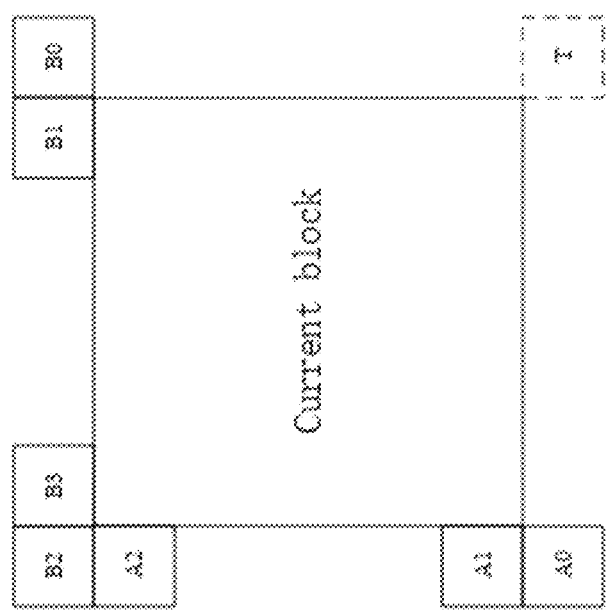
FIG. 25 shows an example of candidates position for affine merge mode.

Inherited affine candidate means that the candidate is derived from the affine motion model of its valid neighbor affine coded block. In the common base, as shown in FIG. 25, the scan order for the candidate positions is: A1, B1, B0, A0 and B2.

After a candidate is derived, full pruning process is performed to check whether same candidate has been inserted into the list. If a same candidate exists, the derived candidate is discarded.

Insert Constructed Affine Candidates

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 25. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2->B3->A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1->B0.

For CP3, the checking priority is A1->A0.

For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

Padding with Zero Motion Vectors

If the number of candidates in affine merge candidate list is less than 5, zero motion vectors with zero reference indices are insert into the candidate list, until the list is full.

2.2.7. B1-Directional Optical Flow

B1-directional Optical flow (BIO) is sample-wise motion refinement which is performed on top of block-wise motion compensation for bi-prediction. The sample-level motion refinement doesn't use signalling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field ($v_x$, $v_y$) is given by an equation $$\partial I^{(k)}/\partial t + v_x \partial I^{(k)}/\partial x + v_y \partial I^{(k)}/\partial y = 0. \qquad (3)$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO} = 1/2 \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \qquad (3)$$

Figure 26:
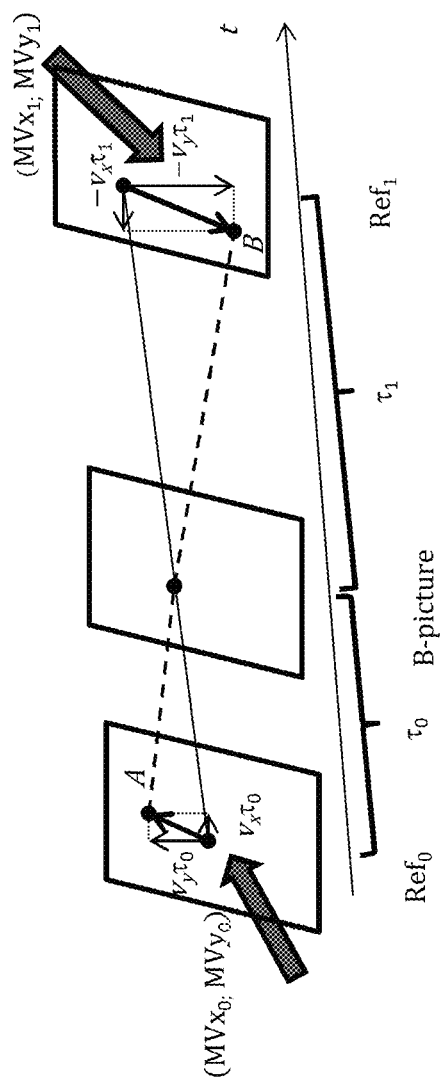
FIG. 26 shows an example of optical flow trajectory.

Here, $\tau_0$ and $\tau_1$ denote the distances to the reference frames as shown on a FIG. 26. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0 \cdot \tau_1 < 0$). In this case, BIO is applied only if the prediction is not from the same time moment (i.e., $\tau_0 \neq \tau_1$), both referenced regions have non-zero motion ($MVx_0, MVy_0, MVx_1, MVy_1 \neq 0$) and the block motion vectors are proportional to the time distance ($MVx_0/MVx_1 = MVy_0/MVy_1 = -\tau_0/\tau_1$).

The motion vector field ($v_x$, $v_y$) is determined by minimizing the difference Δ between values in points A and B (intersection of motion trajectory and reference frame planes on FIG. 9). Model uses only first linear term of a local Taylor expansion for A:

$$\Delta = (I^{(0)} - I^{(1)}{}_0 + v_x(\tau_1 \partial I^{(1)}/\partial x + \tau_0 \partial I^{(0)}/\partial x) + + v_y(\tau_1 \partial I^{(1)}/\partial y + \tau_0 \partial I^{(0)}/\partial y)) \qquad (5)$$

All values in Equation 5 depend on the sample location (i', j'), which was omitted from the notation so far. Assuming the motion is consistent in the local surrounding area, we minimize Δ inside the (2M+1)×(2M+1) square window Ω centered on the currently predicted point (i,j), where M is equal to 2:

$$(v_x, v_y) = \underset{v_x, v_y}{\text{argmin}} \sum_{[i',j'] \in \Omega} \Delta^2[i', j'] \qquad (6)$$

For this optimization problem, the JEM uses a simplified approach making first a minimization in the vertical direction and then in the horizontal direction. This results in $$v_x = (s_1 + r) > m ? clip3\left(-thBIO, thBIO, -\frac{s_3}{(s_1 + r)}\right) : 0 \quad (7)$$

$$v_y = (s_5 + r) > m ? clip3\left(-thBIO, thBIO, -\frac{s_6 - v_x s_2/2}{(s_5 + r)}\right) : 0 \quad (8)$$

where, $$s_1 = \sum_{[i',j]\in\Omega} \left(\tau_1 \partial I^{(1)}/\partial x + \tau_0 \partial I^{(0)}/\partial x\right)^2; \quad (9)$$

$$s_3 = \sum_{[i',j]\in\Omega} \left(I^{(1)} - I^{(0)}\right)\left(\tau_1 \partial I^{(1)}/\partial x + \tau_0 \partial I^{(0)}/\partial x\right);$$

$$s_2 = \sum_{[i',j]\in\Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_5 = \sum_{[i',j]\in\Omega} \left(\tau_1 \partial I^{(1)}/\partial y + \tau_0 \partial I^{(0)}/\partial y\right)^2;$$

$$s_6 = \sum_{[i',j]\in\Omega} \left(I^{(1)} - I^{(0)}\right)\left(\tau_1 \partial I^{(1)}/\partial y + \tau_0 \partial I^{(0)}/\partial y\right)$$

In order to avoid division by zero or a very small value, regularization parameters r and m are introduced in Equations 7 and 8.

$$r = 500 \cdot 4^{d-8} \quad (10)$$

$$m = 700 \cdot 4^{d-8} \quad (11)$$

Here d is bit depth of the video samples.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated only for positions inside the current block. In Equation 9, (2M+1)×(2M+1) square window $\Omega$ centered in currently predicted point on a boundary of predicted block needs to accesses positions outside of the block (as shown in FIG. 27 (a)). In the JEM, values of $I^{(k)}$, $\partial I^{(k)}/\partial x$, $\partial I^{(k)}/\partial y$ outside of the block are set to be equal to the nearest available value inside the block. For example, this can be implemented as padding, as shown in FIG. 27 (b).

With BIO, it's possible that the motion field can be refined for each sample. To reduce the computational complexity, a block-based design of BIO is used in the JEM. The motion refinement is calculated based on 4×4 block. In the block-based BIO, the values of $s_n$ in Equation 9 of all samples in a 4×4 block are aggregated, and then the aggregated values of $s_n$ in are used to derived BIO motion vectors offset for the 4×4 block. More specifically, the following formula is used for block-based BIO derivation:

$$s_{1,b_k} = \sum_{(x,y)\in b_k} \sum_{[i',j]\in\Omega(x,y)} \left(\tau_1 \partial I^{(1)}/\partial x + \tau_0 \partial I^{(0)}/\partial x\right)^2; \quad (12)$$

$$s_{3,b_k} = \sum_{(x,y)\in b_k} \sum_{[i',j]\in\Omega} \left(I^{(1)} - I^{(0)}\right)\left(\tau_1 \partial I^{(1)}/\partial x + \tau_0 \partial I^{(0)}/\partial x\right);$$

$$s_{2,b_k} = \sum_{(x,y)\in b_k} \sum_{[i',j]\in\Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_{5,b_k} = \sum_{(x,y)\in b_k} \sum_{[i',j]\in\Omega} \left(\tau_1 \partial I^{(1)}/\partial y + \tau_0 \partial I^{(0)}/\partial y\right)^2;$$

$$s_{6,b_k} = \sum_{(x,y)\in b_k} \sum_{[i',j]\in\Omega} \left(I^{(1)} - I^{(0)}\right)\left(\tau_1 \partial I^{(1)}/\partial y + \tau_0 \partial I^{(0)}/\partial y\right)$$

where $b_k$ denotes the set of samples belonging to the k-th 4×4 block of the predicted block. $s_n$ in Equations 7 and 8 are replaced by $((s_{n,bk})>>4)$ to derive the associated motion vector offsets.

In some cases, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12 \times 2^{14-d}$; otherwise, it is set to $12 \times 2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient $\partial I/\partial x$ signal first interpolated vertically using BIOfilterS corresponding to the fractional position fracY with de-scaling shift d-8, then gradient filter BIOfilterG is applied in horizontal direction corresponding to the fractional position fracX with de-scaling shift by 18-d. In case of vertical gradient $\partial I/\partial y$ first gradient filter is applied vertically using BIOfilterG corresponding to the fractional position fracY with de-scaling shift d-8, then signal displacement is performed using BIOfilterS in horizontal direction corresponding to the fractional position fracX with de-scaling shift by 18-d. The length of interpolation filter for gradients calculation BIOfilterG and signal displacement BIOfilterF is shorter (6-tap) in order to maintain reasonable complexity. Table 3 shows the filters used for gradients calculation for different fractional positions of block motion vector in BIO. Table 4 shows the interpolation filters used for prediction signal generation in BIO.

TABLE 1

Filters for gradients calculation in BIO

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Interpolation filters for prediction signal generation in BIO

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO is applied to all bi-predicted blocks when the two predictions are from different reference pictures. When LIC is enabled for a CU, BIO is disabled.

In the JEM, OBMC is applied for a block after normal MC process. To reduce the computational complexity, BIO is not applied during the OBMC process. This means that BIO is only applied in the MC process for a block when using its own MV and is not applied in the MC process when the MV of a neighboring block is used during the OBMC process.

2.2.8. Decoder-Side Motion Vector Refinement

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 28:
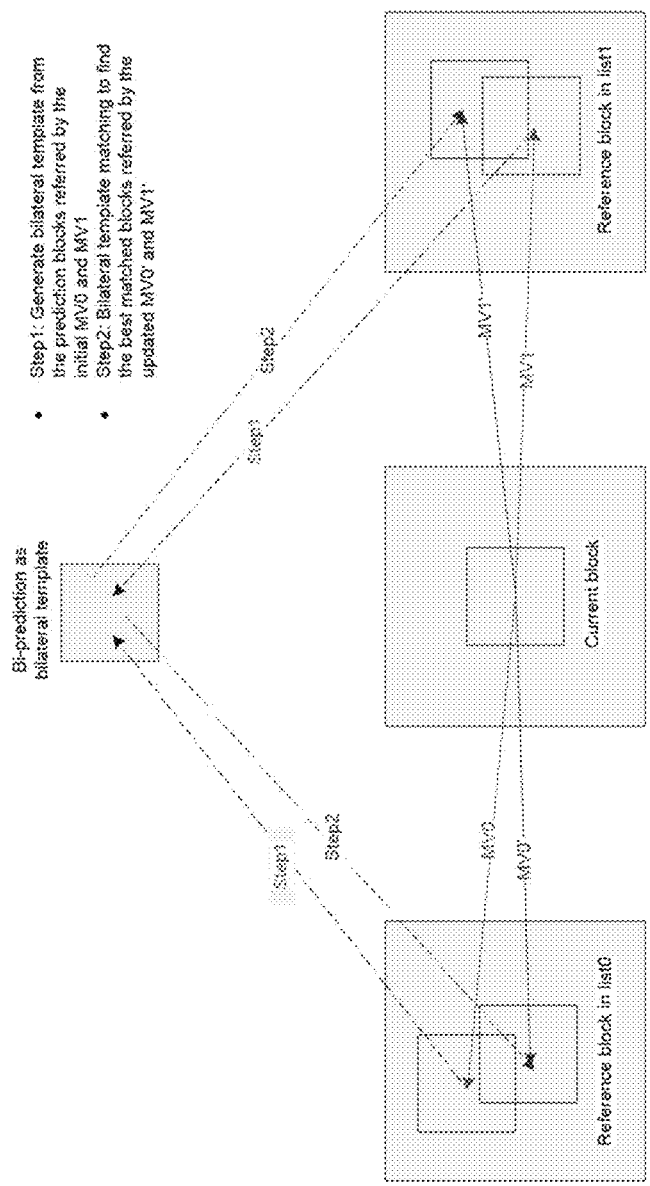
FIG. 28 shows an example of DMVR based on bilateral template matching.

In DMVR, a bilateral template is generated as the weighted combination (i.e. average) of the two prediction blocks, from the initial MV0 of list0 and MV1 of list1, respectively, as shown in FIG. 28. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 28, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

The LUT-based motion vector prediction based on the disclosed technology, which may enhance both existing and future video coding standards, is elucidated in the following examples described for various implementations. Because the LUTs allow the encoding/decoding process to be performed based on historical data (e.g., the blocks that have been processed), the LUT-based motion vector prediction can also be referred to as History-based Motion Vector Prediction (HMVP) method. In the LUT-based motion vector prediction method, one or multiple tables with motion information from previously coded blocks are maintained during the encoding/decoding process. These motion candidates stored in the LUTs are named HMVP candidates. During the encoding/decoding of one block, the associated motion information in LUTs may be added to the motion candidate lists (e.g., merge/AMVP candidate lists), and after encoding/decoding one block, LUTs may be updated. The updated LUTs are then used to code the subsequent blocks. That is, the updating of motion candidates in the LUTs are based on the encoding/decoding order of blocks. The examples below should be considered as examples to explain general concepts. These examples should not be interpreted in a narrow way. Furthermore, these examples can be combined in any manner.

3. EXAMPLES OF PROBLEMS SOLVED BY EMBODIMENTS

In the design of triangle partition, one block could be split to two partitions. To save memory bandwidth due to motion compensation, it is required that the two partitions shall be un-predicted. During the motion compensation process, bi-prediction is used for the diagonal edge and uni-prediction is used for all other remaining parts. If bi-prediction is allowed for each partition, then samples located at the diagonal edge will have four MVs with two of them from one partition and two of them from another partition. Such a design has the following problems:

Only spatial neighboring blocks and temporal blocks are checked in the merge list construction process.

History-based motion vector prediction technology is disallowed for triangle partition.

How to handle triangular partition mode with intra block copy mode is unknown.

4. EXAMPLES OF EMBODIMENTS

The proposed techniques could be applied to any of non-square/non-rectangular partitions, e.g., geometry partitions. In the following descriptions, we use 'triangular partition mode' to represent one as an example of the non-square/non-rectangular partition mode (TPM). It should be noted other kinds of partitions may be also applicable.

The detailed techniques below should be considered as examples to explain general concepts. These techniques should not be interpreted in a narrow way. Furthermore, these inventions can be combined in any manner. Denote a block size as WxH.

1. Instead of always applying triangular prediction mode with the merge mode, it is proposed to enable triangular prediction mode for intra-coded blocks, or non-merge inter-coded blocks
   a. In one example, the two partitions are predicted with different intra prediction modes.
   b. Alternatively, furthermore, the prediction values of samples along edge boundaries may be further filtered.
   c. In one example, the motion information (such as MV) of the two triangular partitions cannot predict each other;
      i. Alternatively, the motion information (such as MV) of one triangular partition can be used to predict the other partition.
2. It is proposed that when one block is split into two geometry partitions, one partition may be coded with intra mode and the other may be coded with inter mode.
   a. In one example, for the inter-coded partition, bi-prediction may be also applied.
   b. In one example, such method may be signaled when current block is coded with merge mode, i.e., for the inter-coded partition, motion information signaled with an merge index.
   c. Alternatively, furthermore, the prediction values of samples along edge boundaries may be further filtered.

d. In one example, only a subset of intra prediction modes may be applied.
   i. The subsets may be different for the two partitions.
   ii. The subsets may be dependent on the position of a partition.
   iii. The subsets may be dependent on the block size and/or block shape.
3. As disclosed in Bullet 1 and Bullet 2, the merge or non-merge inter-coded block can use the current picture as the reference picture.
4. It is proposed that when coding one block with triangular partition mode, inter/intra coded information of non-adjacent spatial blocks may be also treated as predictors for coding current block.
   a. In one example, the motion information of non-adjacent spatial blocks may be utilized.
   b. In one example, intra prediction mode of non-adjacent spatial blocks may be utilized.
   c. Alternatively, coded information of temporal blocks may be further utilized for coding one block with TPM.
5. It is proposed to add motion candidates derived from HMVP candidates in the merge list construction process for TPM coded blocks wherein a HMVP (History based motion vector prediction) candidate is the motion information inherited or derived from previously coded blocks.

Table Maintenance for HMVP Candidate Storage
   a. The maintenance of HMVP candidates and/or updating of tables for storing and/or HMVP candidates may be same as HMVP for normal motion vector.
   b. In one example, the same table may be maintained for HMVP candidates storage which may be utilized for both non-TPM coded blocks and TPM coded blocks.
      i. In one example, motion information used by TPM are not put into the HMVP storage. HMVP table(s) are not updated after encoding/decoding a TPM coded block.
   c. In one example, separate tables may be maintained to store the HMVP candidates for coding TPM coded blocks.
      i. Tables may be maintained for HMVP candidates storage with motion information purely from TPM coded blocks.
      ii. Two tables may be maintained to store uni- and bi-predicted HMVP candidates, respectively.
      iii. Two tables may be maintained to store motion information of the first and second partitions, respectively.
      iv. Two tables may be maintained to store motion information of List 0 and List 1 motion information, respectively.
      v. Alternatively, three tables may be maintained to store uni-predicted from List 0, uni-predicted from L1 and bi-predicted HMVP candidates, respectively.
   d. After coding with TPM coded block, tables for HMVP candidates storage may not be updated.
      i. Alternatively, one/multiple tables for HMVP candidates storage may be updated with the motion information of the first partition.
      ii. Alternatively, one/multiple tables for HMVP candidates storage may be updated with the motion information of the second partition.
      iii. Alternatively, one/multiple tables for HMVP candidates storage may be updated with the motion information from both partitions, by adding two HMVP candidates
      iv. Alternatively, one/multiple tables for HMVP candidates storage may be updated with the motion information from both partitions, by adding one HMVP candidate (e.g., when the two partitions are predicted from two reference picture lists).
      v. Whether to add one or two motion candidates to the HMVP table may depend on whether the two partitions are predicted from the same reference picture lists and/or from same reference picture.
      vi. Whether to add motion information of the first partition or the second partition to the HMVP table may depend on POC difference between the reference pictures and the current picture.
   e. When separate tables are kept for coding TPM- and non-TPM coded blocks, the updating of tables may be invoked based on the mode of one block.
      i. In one example, after decoding a TPM coded block, the motion information may be used to update the table for coding TPM-coded blocks.
      ii. In one example, after decoding a non-TPM coded block, the motion information may be used to update the table for coding non-TPM-coded blocks.
      iii. Alternatively, furthermore, after decoding a non-TPM coded block, the motion information may be used to update the table for coding TPM-coded blocks.

Usage of HMVP Candidates in TPM Coded Blocks
   f. A HMVP candidate may be directly added to the merge list for TPM-coded blocks.
      i. Alternatively, one HMVP candidate may be utilized to derive two motion candidates, e.g., one is uni-prediction with List 0 motion information and the other is uni-prediction with List 1 motion information of the HMVP candidate.
      ii. Pruning may be applied when inserting a motion candidate derived/inherited from a HMVP candidate with other motion candidates derived/inherited from spatial or temporal blocks.
      iii. Pruning may be applied when inserting a motion candidate derived/inherited from a HMVP candidate with a motion candidate derived/inherited from another HMVP candidate.
      iv. Pruning may be applied when inserting a motion candidate derived/inherited from a HMVP candidate with another motion candidate derived/inherited from the same HMVP candidate.
   g. In one example, one or multiple motion candidates derived from one or multiple HMVP candidates may be added after motion candidates derived from spatial and/or temporal blocks such as block 1-7 in FIG. 14. In this case, the HMVP candidate is treated in the same way as the other spatial/temporal merge candidates.
   h. Motion candidates inherited/derived from HMVP candidates may be added to the merge list right after or before a specific step in the merge list construction process which relies on motion information of spatial/temporal blocks.
      i. Alternatively, motion candidates inherited/derived from HMVP candidates may be added to the merge list right after or before several pre-defined steps.
      ii. In one example, one or multiple HMVP candidates with uni-prediction may be added right after all originally uni-predicted candidates with current design.
      iii. In one example, one or multiple HMVP candidates with uni-prediction from L0 or bi-prediction may be added right after all Truncated List0-predicted candidates. Alternatively, furthermore, if a HMVP candidate is with bi-prediction, only List 0 motion information may be kept.
  iv. In one example, one or multiple HMVP candidates with uni-prediction from L1 or bi-prediction may be added right after all Truncated List1-predicted candidates. Alternatively, furthermore, if a HMVP candidate is with bi-prediction, only List 1 motion information may be kept.
  v. In one example, one or multiple HMVP candidates may be added right after all averaged uni-prediction from List 0 or List 1 motion candidates.
  vi. In one example, one or multiple HMVP candidates may be added right before all averaged uni-prediction from List 0 or List 1 motion candidates.
  i. Motion candidates inherited/derived from HMVP candidates may be added to the merge list in an interleaved way with motion candidates inherited/derived from motion information of spatial/temporal blocks.
  j. In one example, motion candidates derived from List 0 and List 1 of each HMVP candidate may be added in order before motion candidates derived from List 0 and List 1 of another HMVP candidate.
  k. In one example, motion candidates derived from List 0 of a first set of HMVP candidates may be added in order before those derived from List 1 of a second set of HMVP candidate.
    i. In one example, the first set and the second set are the same set, i.e., all available HMVP candidates.
    ii. Alternatively, the first set and the second set could be different, such as the first set of HMVP candidates include HMVP candidates with uni-prediction from List 0 and bi-prediction; while the second set of HMVP candidates include HMVP candidates with uni-prediction from List 1 and bi-prediction.
    iii. The number of HMVP candidates associated with the first and the second set may be different.
  l. HMVP candidates of list LX may be first scaled to list L(1−X) and then used for list L(1−X).
    i. The scaled candidates may be inserted after all other candidates.
    ii. The scaled candidates may be inserted after all other candidates except the temporal candidates.
  m. The checking order of HMVP candidates to be used to derive motion candidates to be added to the TPM merge list may be dependent on the indices of the HMVP candidates.
    i. Alternatively, it may be dependent on the prediction directions.
    ii. Alternatively, it may be dependent on the motion information.
6. How many HMVP to be checked in TPM merge list construction process may be pre-defined, e.g., 5.
  a. The number of HMVP candidate to be checked in TPM merge list construction process may depend on block size/block shape/how many candidates are available before checking HMVP candidates.
  b. The number of HMVP candidate to be checked in TPM merge list construction process may be signaled in SPS/VPS/PPS/picture header/slice header/tile group header/CTU rows/CTU/group of CTUs.
  c. When partial of available HMVP candidates are to be checked in TPM merge list construction process, the selection of HMVP candidates may depend on the prediction direction/MV information/reference picture index/POC distances of reference picture and current picture of a candidate and/or candidate index.
7. Whether to and how to apply HMVP on a TPM coded block may depend on the block size (e.g., width and/or height, ratio of width and height) or block shape (e.g., square or non-square).
8. The proposed methods could also be applicable to other kinds of motion candidate lists (such as AMVP list) for geometry partitions.
9. The HMVP table size (i.e., maximum number of history motion candidates could be stored) may depend on a function of one or multiple motion candidate list sizes.
  a. In one example, the HMVP table size may depend on the regular merge list size, the TPM merge list size, the IBC merge list size, the regular inter AMVP list size, the regular inter IBC list size etc. al.
  b. In one example, the HMVP table size may depend on those motion candidate lists which access the same HMVP table.
  c. In one example, the function may be the function Max(inputs) which returns the maximum value among several inputs.
  d. In one example, the HMVP table size may be defined as Max(regular merge list size Minus K0, TPM merge list size Minus K1, IBC merge list size Minus K2).
    i. In one example, K0=K1=K2=1.
10. The HMVP table size (i.e., maximum number of history motion candidates could be stored) may depend on a function of one or multiple HMVP candidate numbers (denoted by numHMVP) that may be added to motion candidate lists.
  a. In one example, it may depend on the number of HMVP candidates that may be added to the motion candidate lists (e.g., the regular merge list, the TPM merge list, the IBC merge list, the regular inter AMVP list, the regular inter IBC list etc. al).
  b. In one example, the function may be the function Max(inputs) which returns the maximum value among several inputs.
  c. In one example, the HMVP table size may be defined as Max(numHMVP for regular merge list Minus K0, numHMVP for regular AMVP list Minus K1).
    ii. In one example, K0=1 and K1=0.
  d. In one example, the HMVP table size may be defined as Max(numHMVP for regular merge list Minus K0, numHMVP for TPM merge list Minus K1, numHMVP for IBC merge list size Minus K2).
    iii. In one example, K0=K1=K2=1.
11. The HMVP table size for one coding mode may be different from another coding mode, and it may be dependent on the motion candidate list size.
  a. In one example, the HMVP table size for the regular merge and TPM merge lists may be dependent on the regular merge list size.
    iv. In one example, the HMVP table size may be equal to regular merge list size minus K0, e.g. K0=1.
  b. In one example, the HMVP table size for the regular merge and TPM merge lists may be dependent on the regular merge list size and the TPM merge list size.
    v. In one example, it may be defined as Max(regular merge list size Minus K0, TPM merge list size Minus K1).
    vi. In one example, the HVMP table for the normal inter-AMVP follows that used for the regular merge and TPM merge lists.

c. In one example, the HMVP table size for the IBC-coded blocks depend on that for the regular merge list and/or the TPM merge list.
   vii. For example, the HMVP table size for the IBC-coded blocks is equal to that for the regular merge list and/or the TPM merge list.
   viii. Alternatively, the HMVP table size for the IBC-coded merge/AVMP blocks may depend on the size of IBC merge/AMVP candidate list size.
d. Indications of the HMVP table sizes may be signaled in the bitstream.
   ix. When the signaled size is equal to 0, HMVP candidates are not inserted to any motion candidate lists.
   x. In one example, HMVP table size is not allowed to be 0.
   xi. Alternatively, HMVP table size minus K0 is signaled, e.g. K0=1.
12. Indications of number of allowed HMVP candidates that may be added to motion candidate lists may be signaled in the bitstream.
   a. In one example, for each mode (e.g., IBC or non-IBC; merge no AMVP), an indication of number of allowed HMVP candidates may be signaled independently.
   b. Alternatively, the indications of numbers of allowed HMVP candidates may be signaled in a predictive way.
   c. Alternatively, furthermore, the HMVP table sizes may depend on the allowed number of HMVP candidates.
   d. For example, the number of allowed HMVP candidates that may be added to motion candidate lists is not allowed to be 0.
   e. Alternatively, the number of allowed HMVP candidates that may be added to motion candidate lists minus K0 may be signaled, e.g. K0=1.
   f. Alternatively, predictive coding of the number of allowed HMVP candidates that may be added to a motion candidate list (denoted by numHMVP) and the number of maximum motion candidate in the motion candidate list (denoted by numMotionList) may be applied.
      xii. In one example, the difference between numMotionList and numHMVP may be coded.
      xiii. In one example, the difference between (numMotionList-K0) and numHMVP may be coded, e.g., K0=1.
13. Number of allowed HMVP candidates that may be added to motion candidate lists may be dependent on the motion candidate list sizes.
   a. In one example, it may be derived from the corresponding motion candidate list size, such as (list size—K0), e.g., K0=0 or 1.
   b. In one example, it may be derived from the size of the corresponding HMVP table that is used by the motion candidate list, such as (table size—K0), e.g., K0=0 or 1.
14. A conformance bitstream shall satisfy that the number of allowed HMVP candidates that may be added to a motion candidate list is no larger than the number of maximum motion candidate in the motion candidate list.
   a. Alternatively, a conformance bitstream shall satisfy that the number of allowed HMVP candidates that may be added to a motion candidate list is no larger than (the number of maximum motion candidate in the motion candidate list minus K0), e.g., K0=1.

Figure 29:
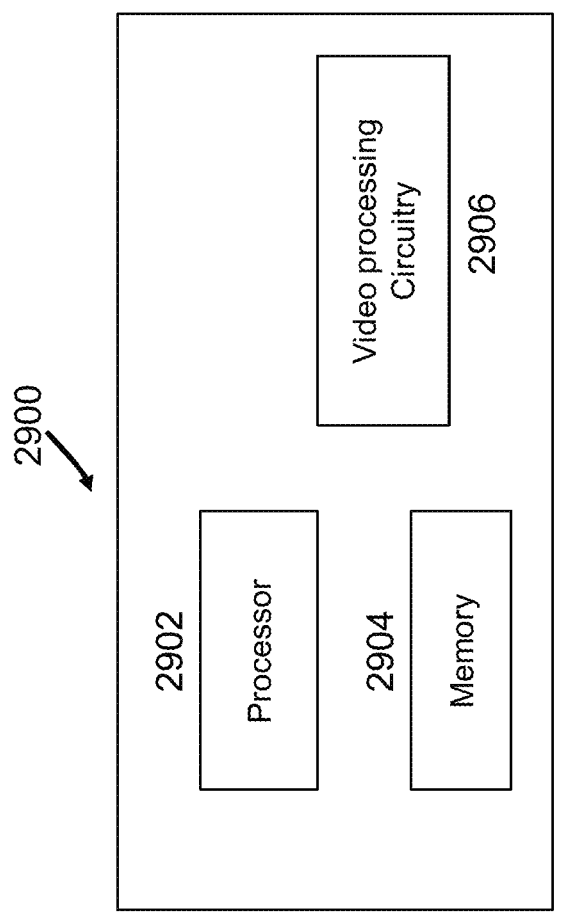
FIG. 29 is a block diagram of an example of a video processing apparatus.

FIG. 29 is a block diagram of a video processing apparatus 2900. The apparatus 2900 may be used to implement one or more of the methods described herein. The apparatus 2900 may be embodied in a smartphone, tablet, computer, Internet of Things (IoT) receiver, and so on. The apparatus 2900 may include one or more processors 2902, one or more memories 2904 and video processing hardware 2906. The processor(s) 2902 may be configured to implement one or more methods described in the present document. The memory (memories) 2904 may be used for storing data and code used for implementing the methods and techniques described herein. The video processing hardware 2906 may be used to implement, in hardware circuitry, some techniques described in the present document.

Figure 31:
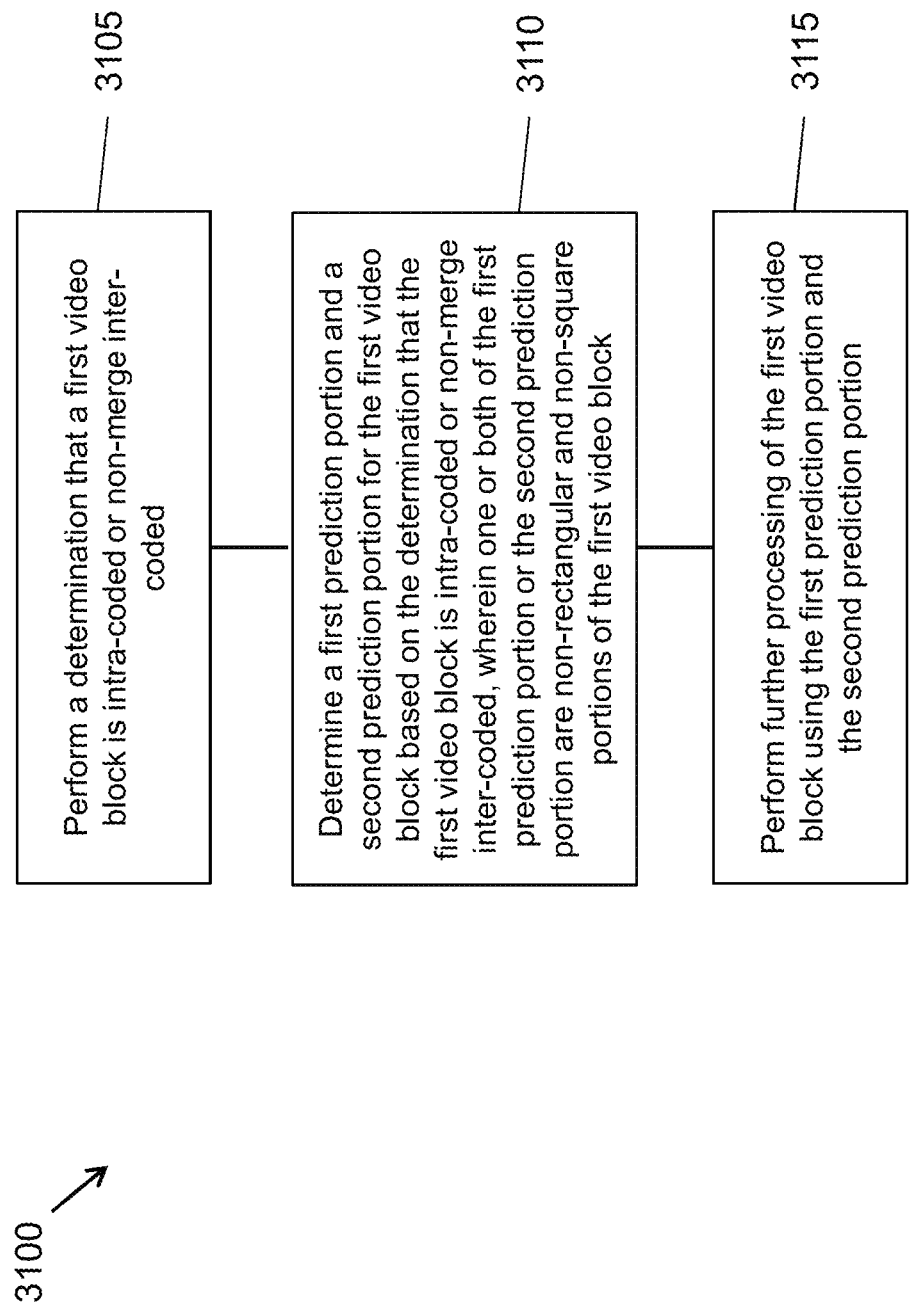
FIG. 31 is a flowchart for an example of a video processing method.

FIG. 31 is a flowchart for a method 3100 of processing a video. The method 3100 includes performing a determination (3105) that a first video block is intra-coded or non-merge inter-coded, determining (3110) a first prediction portion and a second prediction portion for the first video block based on the determination that the first video block is intra-coded or non-merge inter-coded, wherein one or both of the first prediction portion or the second prediction portion are non-rectangular and non-square portions of the first video block, and performing (3115) further processing of the first video block using the first prediction portion and the second prediction portion.

Figure 32:
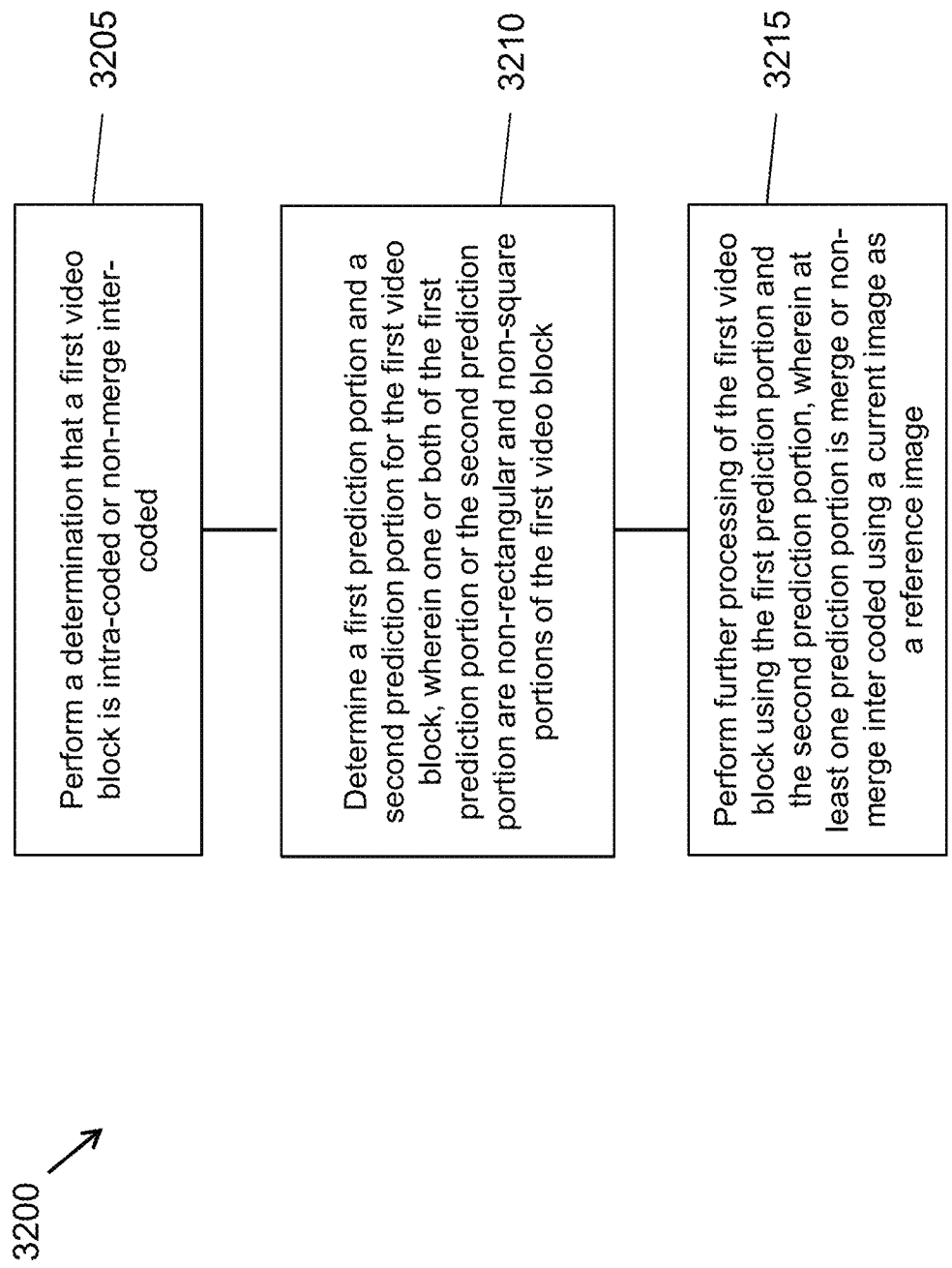
FIG. 32 is a flowchart for an example of a video processing method.

FIG. 32 is a flowchart for a method 3200 of processing a video. The method 3200 includes performing a determination (3205) that a first video block is intra-coded or non-merge inter-coded, determining (3210) a first prediction portion and a second prediction portion for the first video block, wherein one or both of the first prediction portion or the second prediction portion are non-rectangular and non-square portions of the first video block, and performing (3215) further processing of the first video block using the first prediction portion and the second prediction portion, wherein at least one prediction portion is merge or non-merge inter coded using a current image as a reference image.

Figure 33:
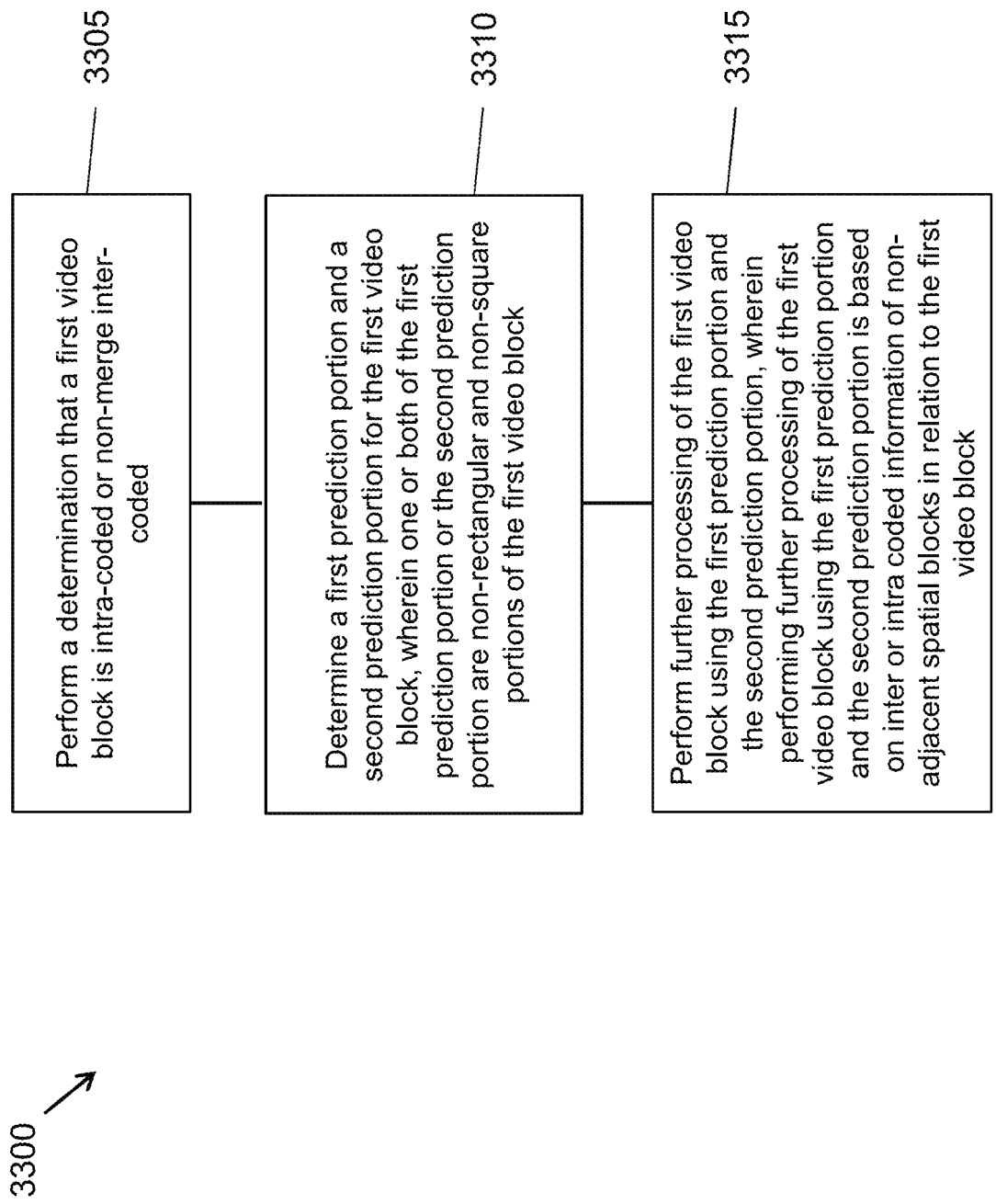
FIG. 33 is a flowchart for an example of a video processing method.

FIG. 33 is a flowchart for a method 3300 of processing a video. The method 3300 includes performing a determination (3305) that a first video block is intra-coded or non-merge inter-coded, determining (3310) a first prediction portion and a second prediction portion for the first video block, wherein one or both of the first prediction portion or the second prediction portion are non-rectangular and non-square portions of the first video block, and performing (3315) further processing of the first video block using the first prediction portion and the second prediction portion, wherein performing further processing of the first video block using the first prediction portion and the second prediction portion is based on inter or intra coded information of non-adjacent spatial blocks in relation to the first video block.

Figure 34:
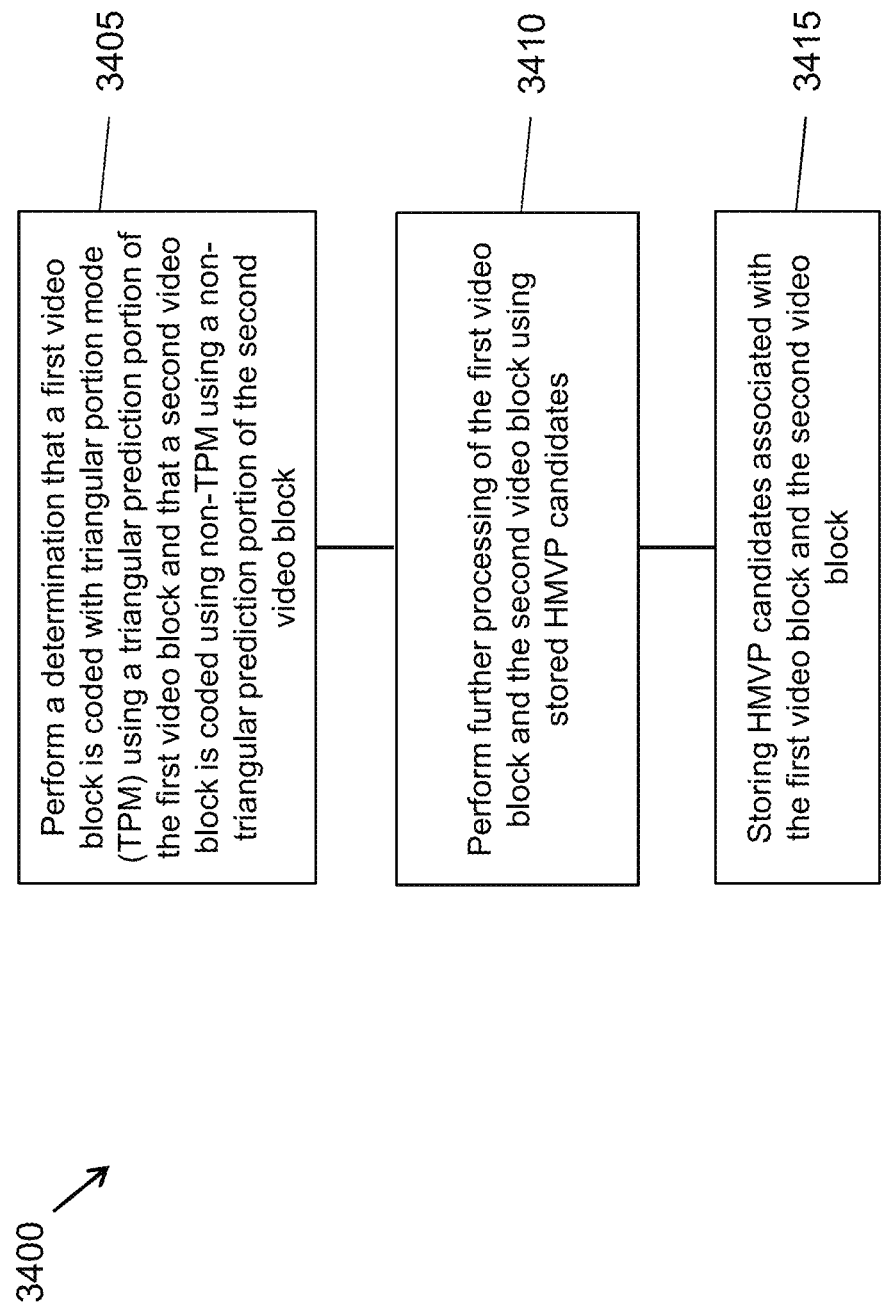
FIG. 34 is a flowchart for an example of a video processing method.

FIG. 34 is a flowchart for a method 3400 of processing a video. The method 3400 includes performing a determination (3405) that a first video block is coded with triangular portion mode (TPM) using a triangular prediction portion of the first video block and that a second video block is coded using non-TPM using a non-triangular prediction portion of the second video block, performing (3410) further processing of the first video block and the second video block using stored HMVP candidates, and storing (3415) HMVP candidates associated with the first video block and the second video block.

Figure 35:
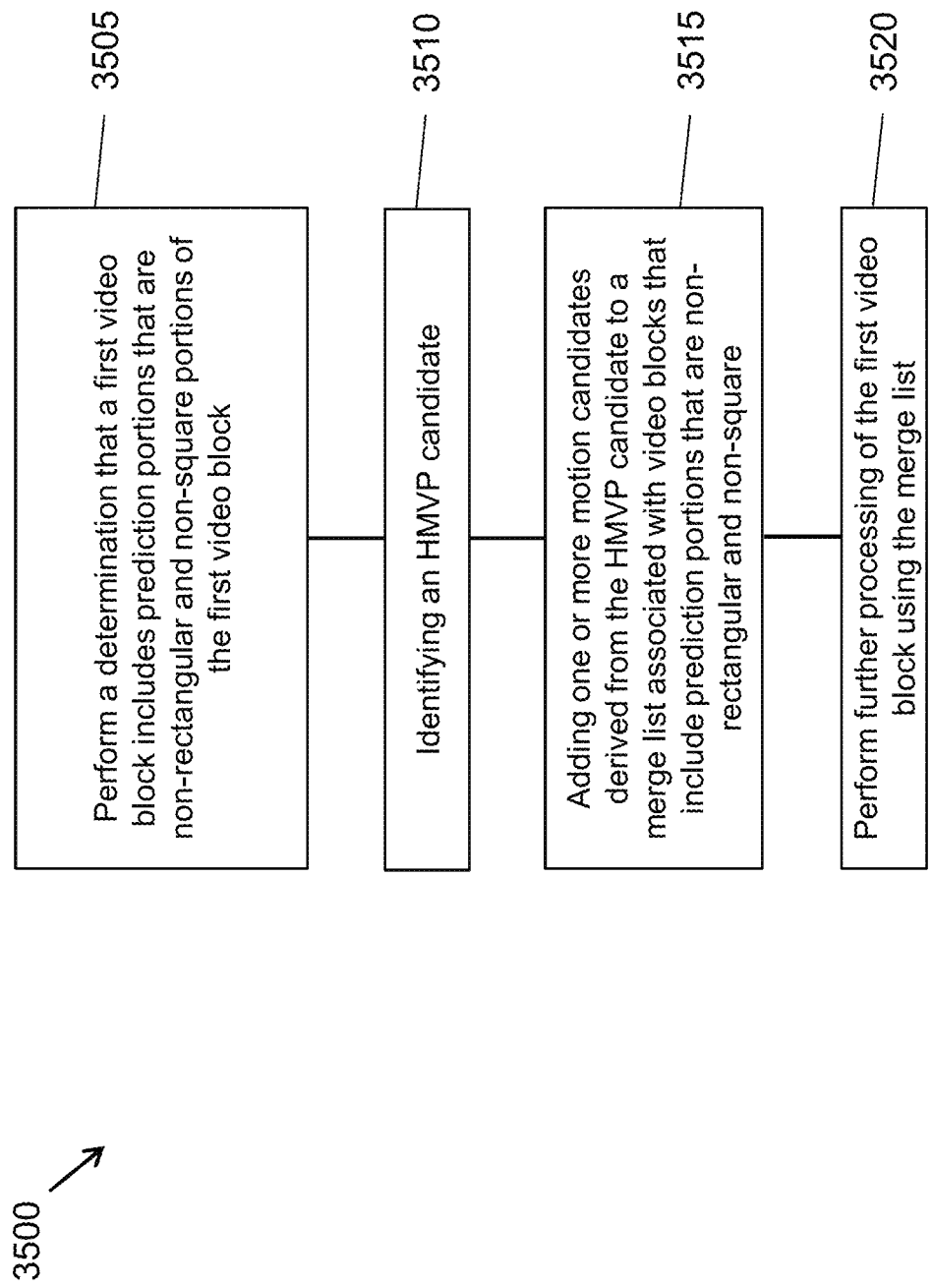
FIG. 35 is a flowchart for an example of a video processing method.

FIG. 35 is a flowchart for a method 3500 of processing a video. The method 3500 includes performing a determination (3505) that a first video block includes prediction portions that are non-rectangular and non-square portions of the first video block, identifying (3510) an HMVP candidate, adding (3515) one or more motion candidates derived from the HMVP candidate to a merge list associated with video blocks that include prediction portions that are non-rectangular and non-square, and performing (3520) further processing of the first video block using the merge list.

With reference to methods 3100, 3200, 3300, 3400, and 3500, some examples of determining a candidate for encoding and their use are described in Section 4 of the present document. For example, as described in Section 4, video blocks can be processed using prediction portions that are non-square and non-rectangular.

With reference to methods 3100, 3200, 3300, 3400, and 3500, a video block may be encoded in the video bitstream in which bit efficiency may be achieved by using a bitstream generation rule related to motion information prediction.

The methods can include determining image information of the first prediction portion using a first intra prediction mode; and determining image information of the second prediction portion using a second intra prediction mode, the first intra prediction mode being different than the second intra prediction mode.

The methods can include filtering prediction values related to the first prediction portion and the second prediction portion along an edge boundary between the first prediction portion and the second prediction portion.

The methods can include determining, by the processor, first motion information of the first prediction portion; and determining, by the processor, second motion information of the second prediction portion, wherein the first motion information is determined without using the second motion information, and the second motion information is determined without using the first motion information.

The methods can include determining, by the processor, first motion information of the first prediction portion; and determining, by the processor, second motion information of the second prediction portion, wherein the second motion information is determined using the first motion information.

The methods can include processing the first prediction portion with intra mode coding; and processing the second prediction portion with inter mode coding.

The methods can include wherein processing the second prediction portion includes applying bi-prediction.

The methods can include wherein processing the second prediction portion includes determining motion information signaled with a merge index.

The methods can include filtering prediction values related to the first prediction portion and the second prediction portion along an edge boundary between the first prediction portion and the second prediction portion.

The methods can include wherein a subset of intra mode coding is used.

The methods can include wherein the first prediction portion and the second prediction portion are associated with different subsets of intra mode coding.

The methods can include wherein the first prediction portion and the second prediction portion are associated with different subsets of intra mode coding based on positions of the first prediction portion and the second prediction portion.

The methods can include wherein the first prediction portion and the second prediction portion are associated with different subsets of intra mode coding based on one or more of: size of the first video block, or shape of the first video block.

The methods can include wherein the inter or intra coded information of non-adjacent spatial video blocks includes motion information of the non-adjacent spatial video blocks.

The methods can include wherein an intra prediction mode of the non-adjacent spatial video blocks is used.

The methods can include wherein coded information of temporal blocks is used.

The methods can include adding history based motion vector prediction (HMVP) candidates in a motion vector prediction candidate list, wherein the HMVP candidates includes motion information based on previously coded video blocks; and decoding the first video block based on the HMVP candidates.

The methods can include wherein the HMVP candidates are stored in a table, and wherein motion information used by TPM is not stored in the table.

The methods can include wherein the table is not updated after encoding or decoding the first video block using TPM.

The methods can include wherein the HMVP candidates are stored in a first table and a second table, the first table storing HMVP candidates for TPM, and the second table storing HMVP candidates for non-TPM.

The methods can include wherein one of the first table or the second table stores un-predicted HMVP candidates, and the other stores bi-predicted HMVP candidates.

The methods can include wherein one of the first table or the second table stores motion information of the first partition portion, and the other stores motion information of the second partition portion.

The methods can include wherein one of the first table or the second table stores motion information of List 0, and the other stores motion information of List 1.

The methods can include wherein the first table stores uni-predicted HMVP candidates from List 0, the second table stores uni-predicted HMVP candidates from List 1, and a third table stores bi-predicted HMVP candidates.

The methods can include wherein tables for HMVP candidate storage is not updated based on one or both of the first prediction portion or the second prediction portion being non-rectangular and non-square geometry portions of the first video block.

The methods can include updating one or more of the first table or the second table for HMVP candidates storage with motion information of the first partition portion.

The methods can include updating one or more of the first table or the second table for HMVP candidates storage with motion information of the second partition portion.

The methods can include updating one or more of the first table or the second table for HMVP candidates storage with motion information of the first partition portion and motion information of the second partition portion.

The methods can include determining that the first partition portion and the second partition portion are predicted from two reference picture lists; and updating one or more tables for HMVP candidates storage with motion information of one HMVP candidate based on the determination that the first partition portion and the second partition portion are predicted from two reference picture lists.

The methods can include determining that the first partition portion and the second partition portion are predicted using a same reference picture list or a same reference picture, wherein the tables are updated based on the determination that the first partition portion and the second partition portion are predicted using the same reference picture list or the same reference picture.

The methods can include determining a picture order count (POC) difference between a reference picture and a current picture, wherein motion information of the first partition portion or the second partition portion are added to the one or more tables based on the POC difference.

The methods can include determining characteristics regarding coding of the first video block; and updating one or both of the first table or the second table based on the characteristics regarding coding of the first video block.

The methods can include wherein motion information is used to update a table associated with TPM video blocks after decoding of a TPM video block.

The methods can include wherein motion information is used to update a table associated with non-TPM video blocks after decoding of a non-TPM video block.

The methods can include wherein motion information is used to update a table associated with TPM video blocks after decoding of a non-TPM video block.

The methods can include determining a first motion candidate and a second motion candidate from the HMVP candidate, one of the first merge candidate or the second merge candidate being uni-prediction with List 0 motion information of the HMVP candidate, and the other being uni-prediction with List 1 motion information of the HMVP candidate.

The methods can include pruning based on an insertion of a motion candidate derived from the HMVP candidate with other motion candidates that are based on spatial or temporal video blocks.

The methods can include pruning based on an insertion of a motion candidate derived from the HMVP candidate with other motion candidates that are based on other HMVP candidates.

The methods can include pruning based on an insertion of a motion candidate derived from the HMVP candidate with other motion candidates that are based on the HMVP candidate.

The methods can include adding the motion candidates derived from the HMVP candidate associated with the first video block to a merge list after motion candidates derived from one or both of spatial or temporal video blocks.

The methods can include adding a motion candidate derived from the HMVP candidate to the merge list after or before a merge list construction process based on motion information of spatial or temporal video blocks.

The methods can include adding a motion candidate derived from the HMVP candidate to the merge list after or before a pre-defined step.

The methods can include adding the motion candidates derived from the HMVP candidate with uni-prediction after other originally uni-predicted candidates.

The methods can include adding the motion candidates derived from the HMVP candidate with uni-prediction from List 0 or bi-prediction after truncated List 0 predicted candidates.

The methods can include adding the motion candidates derived from the HMVP candidate with uni-prediction from List 1 or bi-prediction after truncated List 1 predicted candidates.

The methods can include adding the motion candidates derived from the HMVP candidate after averaged uni-prediction from List 0 or List 1 motion candidates.

The methods can include adding the motion candidates derived from the HMVP candidate before averaged uni-prediction from List 0 or List 1 motion candidates.

The methods can include wherein motion candidates derived from HMVP candidates are added to the merge list in accordance with interleaving with motion candidates that are based on motion information of spatial or temporal video blocks in relation to the first video block.

The methods can include wherein motion candidates derived from List 0 and List 1 of the HMVP candidate is added in order before motion candidates derived from List 0 and List 1 of another HMVP candidate.

The methods can include herein motion candidates derived from List 0 of a first set of HMVP candidates are added in order before motion candidates derived from List 1 of a second set of HMVP candidates.

The methods can include wherein the first set and the second set are the same, wherein the first set and the second set include all available HMVP candidates.

The methods can include wherein the first set and the second set are different, the first set including HMVP candidates with uni-prediction from List 0 and bi-prediction, the second set including HMVP candidates with uni-prediction from List 1 and bi-prediction.

The methods can include wherein the first set includes a first number of HMVP candidates, the second set includes a second number of HMVP candidates, the first number and the second number being different.

The methods can include wherein a scaled motion candidate may be derived from a HMVP candidate by scaling its motion vector of list LX to list L(1−X) and the scaled motion candidate is assigned with the scaled motion vector and list L(1−X).

The methods can include wherein the scaled motion candidates derived from HMVP candidates are inserted after other motion candidates derived from HMVP candidates.

The methods can include wherein the scaled motion candidates derived from HMVP candidates are inserted before temporal candidates.

The methods can include wherein a checking order of HMVP candidates to be added to the merge list is based on indices of the HMVP candidates.

The methods can include wherein a checking order of HMVP candidates to be added to the merge list is based on prediction directions.

The methods can include wherein a checking order of HMVP candidates to be added to the merge list is based on motion information.

The methods can include wherein a number of HMVP candidates to be checked in a TPM merge list construction process is pre-defined.

The methods can include wherein a number of HMVP candidates to be checked in a TPM merge list construction process is based on a block size of the first video block, a block shape of the first video block, or a number of candidates available before checking HMVP candidates.

The methods can include wherein a number of HMVP candidates to be checked in a TPM merge list construction process is signaled in a video parameter set (VPS), a sequence parameter set (SPS), a picture parameter set (PPS), a picture header, a tile group header, a slice header, a group of rows of coding tree units (CTUs), a CTU, or a group of CTUs.

The methods can include wherein selection of the HMVP candidates is based on a prediction direction, a motion vector (MV) information, a reference picture index, a POC distances of reference picture and current picture of one or both of: a candidate, or a candidate index.

The methods can include wherein application of HMVP in association with the first video block is based on a block size of the first video block or a block shape of the first video block.

The methods can include wherein the non-rectangular and non-square portions are triangular.

It will be appreciated that the disclosed techniques may be embodied in video encoders or decoders to improve compression efficiency when the coding units being compressed have shaped that are significantly different than the traditional square shaped blocks or rectangular blocks that are half-square shaped. For example, new coding tools that use long or tall coding units such as 4×32 or 32×4 sized units may benefit from the disclosed techniques.

Figure 36:
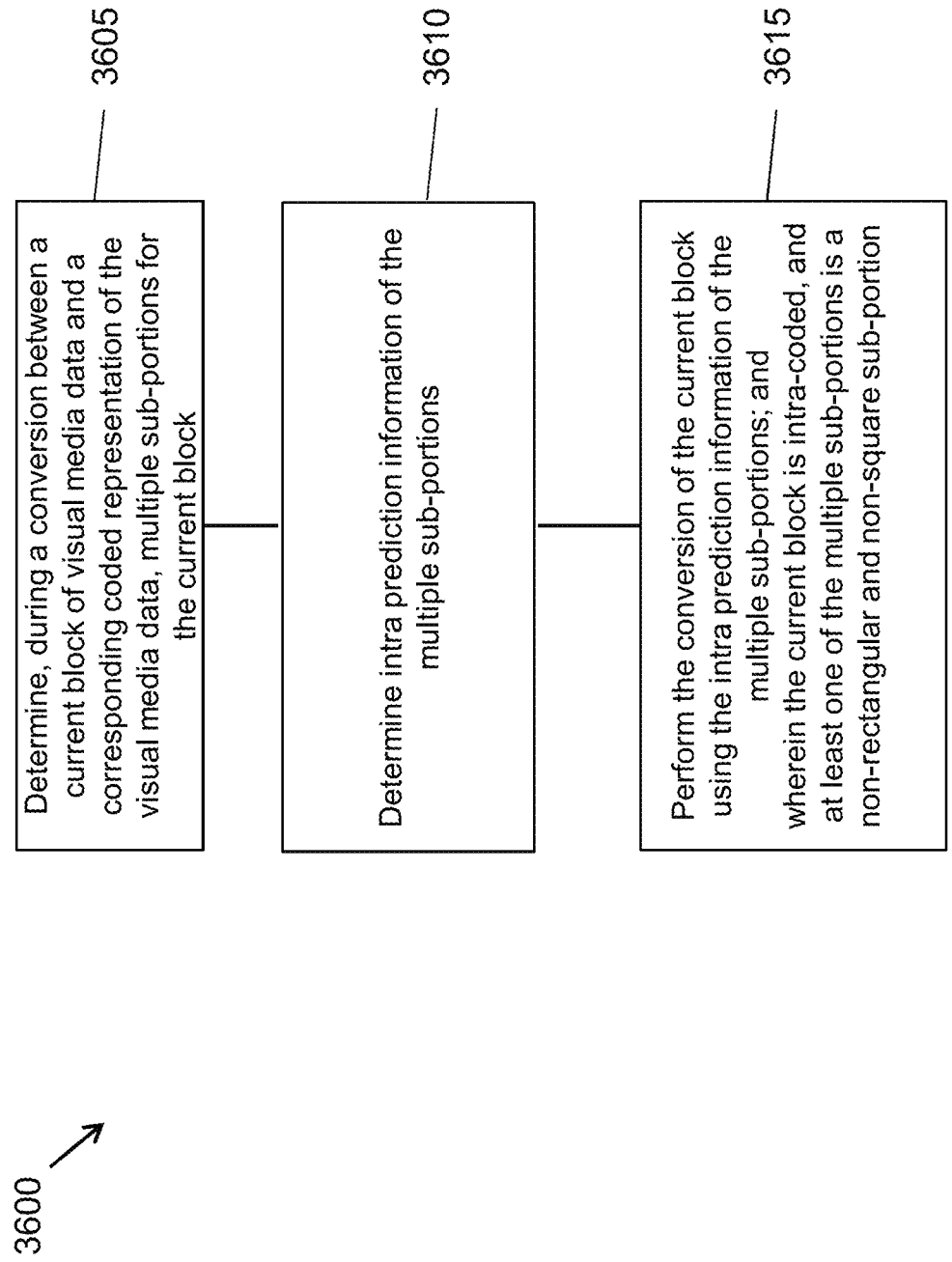
FIG. 36 is a flowchart for an example of a video processing method.

FIG. 36 is a flowchart for a method 3600 of processing a video. The method 3600 includes determining (3605), during a conversion between a current block of visual media data and a corresponding coded representation of the visual media data, multiple sub-portions for the current block; determining (3610) intra prediction information of the multiple sub-portions; and performing (3615) performing the conversion of the current block using the intra prediction information of the multiple sub-portions; and wherein the current block is intra-coded, and at least one of the multiple sub-portions is a non-rectangular and non-square sub-portion. It should be noted that the sub-portion may equivalent to the prediction portion above.

In some implementations, additional modifications can be performed to method 3600. For example, determining intra prediction information of the multiple sub-portions comprises: determining a first intra prediction information of a first sub-portion in the multiple sub-portions using a first intra prediction mode; determining a second intra prediction information of a second sub-portion in the multiple sub-portions using a second intra prediction mode; wherein the first intra prediction mode is different from the second intra prediction mode. The first intra prediction information is determined by using a first subset of intra prediction modes, and the second intra prediction information is determined by using second subset of intra prediction modes; wherein first subset of intra prediction modes is different from the second subset of intra prediction modes. The subset of intra prediction modes is based on at least one of a position, a size and a shape of the first sub-portion and/or second sub-portion. Determining intra prediction information of the multiple sub-portions further comprises: filtering prediction values of samples along an edge boundary of the at least one of the multiple sub-portions. First intra prediction information of a first sub-portion of the multiple sub-portions is determined without using the second intra prediction information of a second sub-portion of the multiple sub-portions, and the second intra prediction information of the second sub-portion is determined without using the first intra prediction information of the first sub-portion. First intra prediction information of a first sub-portion of the multiple sub-portions is determined using second intra prediction information of a second sub-portion of the multiple sub-portions, and/or the second intra prediction information of the second sub-portion is determined using the first intra prediction information of the first sub-portion.

Figure 37:
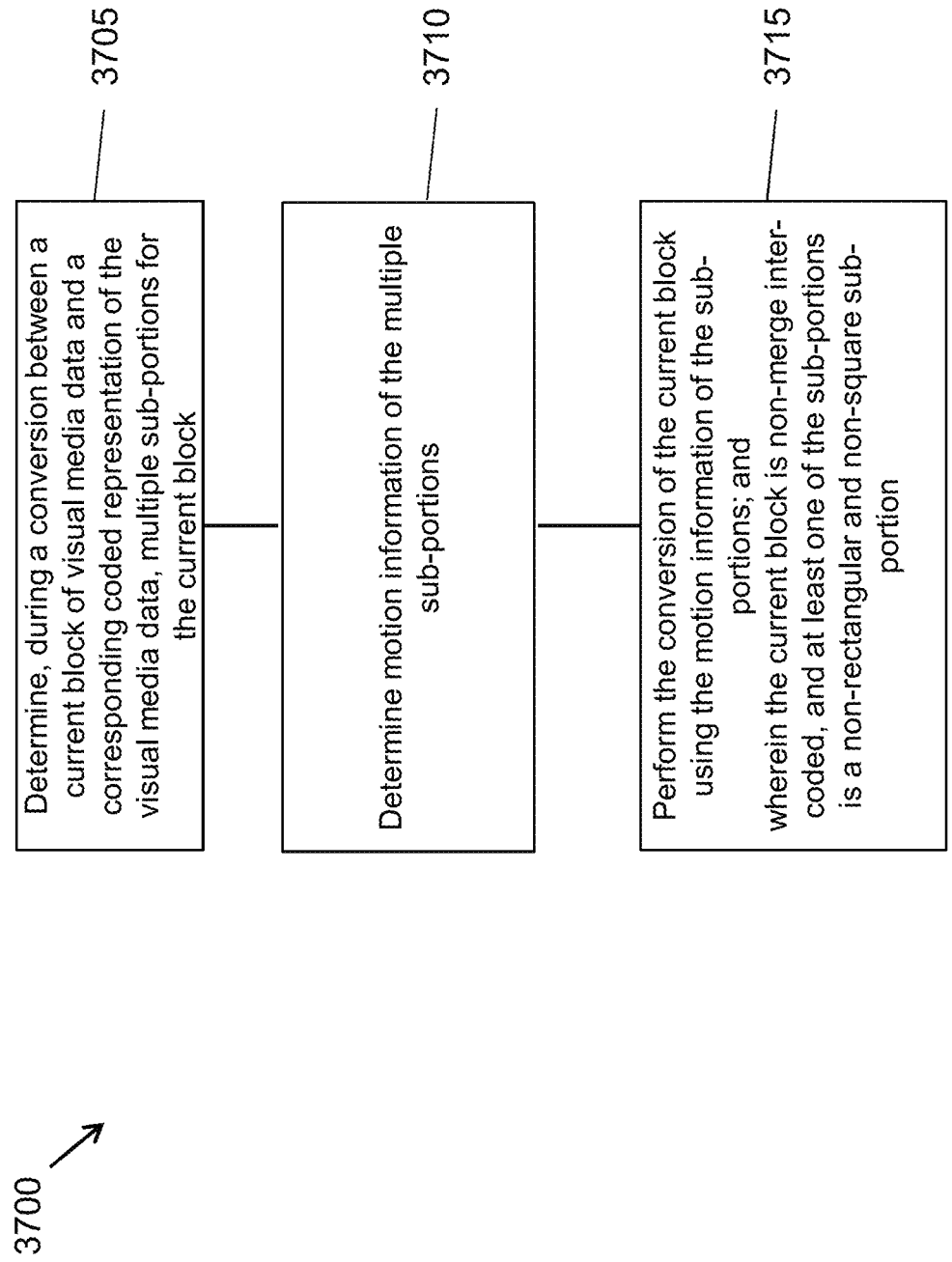
FIG. 37 is a flowchart for an example of a video processing method.

FIG. 37 is a flowchart for a method 3700 of processing a video. The method 3700 includes determining (3705), during a conversion between a current block of visual media data and a corresponding coded representation of the visual media data, multiple sub-portions for the current block; determining (3710) motion information of the multiple sub-portions; performing (3715) the conversion of the current block using the motion information of the multiple sub-portions; and wherein the current block is non-merge inter-coded, and at least one of the multiple sub-portions is a non-rectangular and non-square sub-portion.

In some implementations, additional modifications can be performed to method 3700. For example, determining motion information of the multiple sub-portions comprises: determining a first motion information of a first sub-portion in the multiple sub-portions using a first intra prediction mode; determining a second motion information of a second sub-portion in the multiple sub-portions using a second intra prediction mode. Determining intra prediction of the multiple sub-portions further comprises: filtering prediction values of samples along an edge boundary of the at least one of the multiple sub-portions. The first motion information of the first sub-portion is determined without using the second motion information of the second sub-portion, and the second motion information of the second sub-portion is determined without using the first motion information of the first sub-portion. The first motion information of the first sub-portion is determined using the second motion information of the second prediction, and/or the second motion information of the second sub-portion is determined using the first motion information of the first sub-portion.

Figure 38:
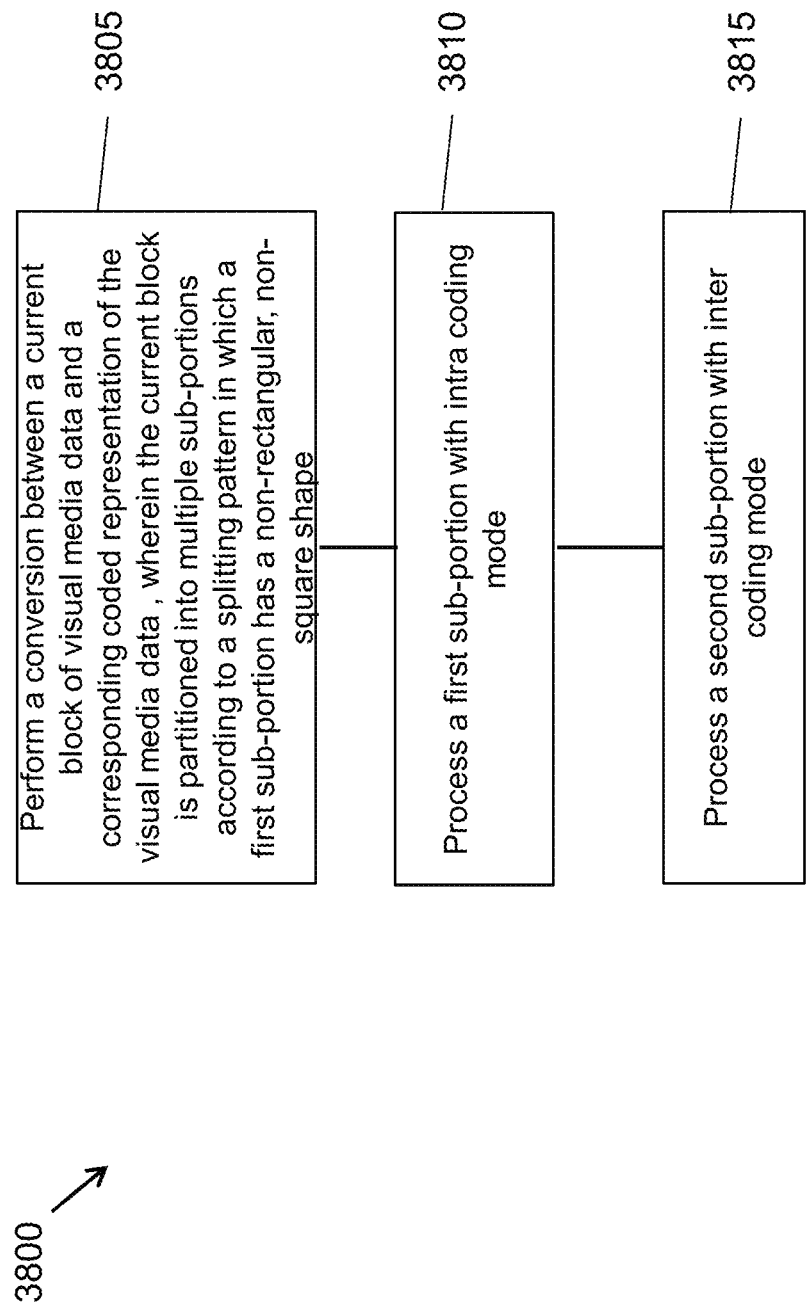
FIG. 38 is a flowchart for an example of a video processing method.

FIG. 38 is a flowchart for a method 3800 of processing a video. The method 3800 includes performing (3805) a conversion between a current block of visual media data and a corresponding coded representation of the visual media data, wherein the current block is partitioned into multiple sub-portions according to a splitting pattern in which a first sub-portion has a non-rectangular, non-square shape; processing (3810) a first sub-portion with intra coding mode; and processing (3815) a second sub-portion with inter coding mode.

In some implementations, additional modifications can be performed to method 3800. For example, the second sub-portion is processed by applying bi-prediction. Signaling motion information with an merge index in response to the current block being coded with merge mode. Determining motion information of the first predication portion using a subset of intra prediction mode. The subset of intra prediction modes is based on at least one of a position of the first predication portion, a size of a first predication portion and a shape of a first predication portion.

Figure 39:
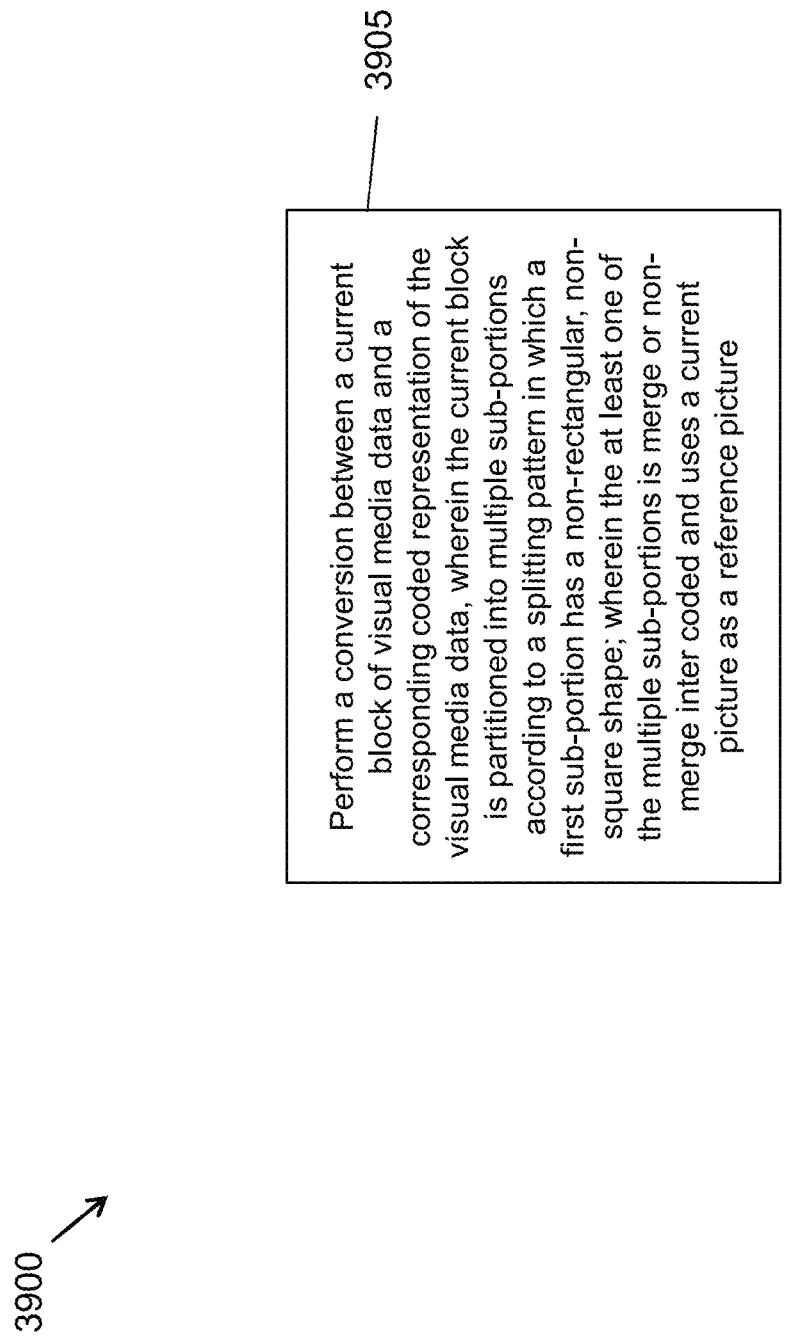
FIG. 39 is a flowchart for an example of a video processing method.

FIG. 39 is a flowchart for a method 3900 of processing a video. The method 3900 includes performing (3905) a conversion between a current block of visual media data and a corresponding coded representation of the visual media data, wherein the current block is partitioned into multiple sub-portions according to a splitting pattern in which a first sub-portion has a non-rectangular, non-square shape; wherein the at least one of the multiple sub-portions is merge or non-merge inter coded and uses a current picture as a reference picture.

Figure 40:
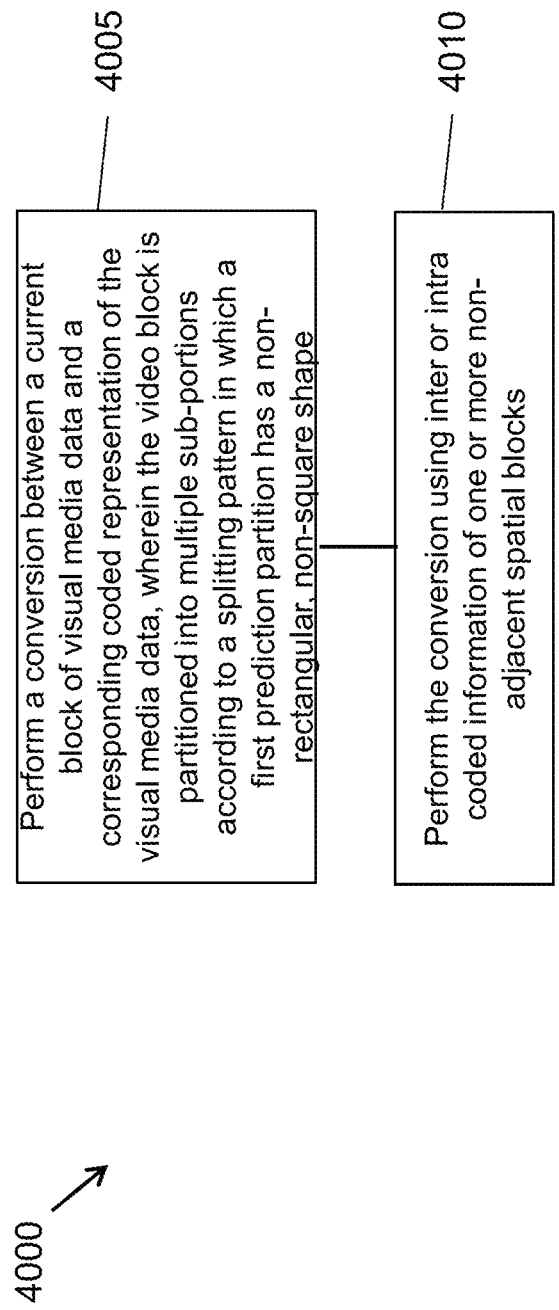
FIG. 40 is a flowchart for an example of a video processing method.

FIG. 40 is a flowchart for a method 4000 of processing a video. The method 4000 includes performing (4005) a conversion between a current block of visual media data and a corresponding coded representation of the visual media data, wherein the current block is partitioned into multiple sub-portions according to a splitting pattern in which a first prediction partition has a non-rectangular, non-square shape; and performing (4010) the conversion using inter or intra coded information of one or more non-adjacent spatial blocks.

In some implementations, additional modifications can be performed to method 4000. For example, the inter or intra coded information of one or more non-adjacent spatial blocks comprises motion information of the one or more non-adjacent spatial blocks. Performing the conversion of the current block using inter or intra coded information of one or more non-adjacent spatial blocks comprises: performing the conversion of the current block using intra prediction mode of the one or more non-adjacent spatial blocks. Coded information of temporal blocks is used.

Figure 41:
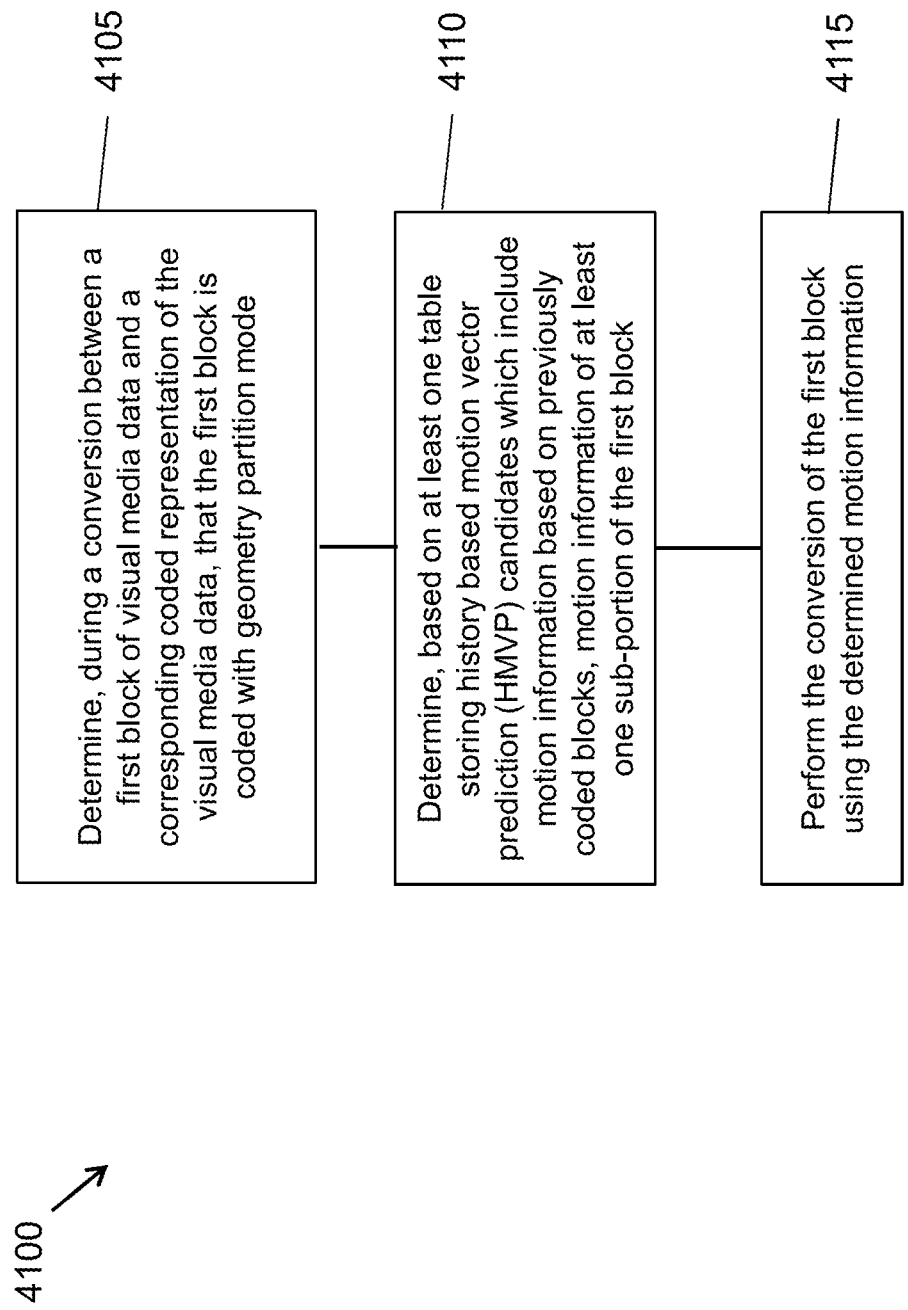
FIG. 41 is a flowchart for an example of a video processing method.

FIG. 41 is a flowchart for a method 4100 of processing a video. The method 4100 includes determining (4105), during a conversion between a first block of visual media data and a corresponding coded representation of the visual media data, the first block being coded with geometry partition mode; determining (4110) based on at least one table storing history based motion vector prediction (HMVP) candidates which include motion information based on previously coded blocks, motion information of at least one sub-portion of the first block; performing (4115) the conversion of the first block using the determined motion information.

In some implementations, additional modifications can be performed to method 4100. For example, the first block being coded with geometry partition mode comprises: splitting the first block to multiple sub-portions; wherein at least one of the multiple sub-portions is a non-rectangular and non-square portion. Determining, during a conversion between a second block of the visual media data and the corresponding coded representation of the visual media data, motion information of the second block based on the same table that is used for the first block, and the second block is not using the geometry partition mode. The motion information used by the first block is refrained from being stored in the at least one table. The at least one table is not updated after the conversion of the first block. The at least one table includes multiple tables maintained to store the HMVP candidates for blocks with the geometry partition mode. For the at least one table, the stored HMVP candidates only have motion information according to that used by blocks with the geometry partition mode. The at least one table includes two tables maintained to store un-predicted HMVP candidates and bi-predicted HMVP candidates, respectively. The at least one table includes two tables maintained to store motion information of a first sub-portion and a second sub-portion of the first block, respectively. The at least one table includes two tables maintained to store motion information of List 0 and List 1, respectively. The at least one table includes three tables maintained to store uni-predicted HMVP candidates from List 0, uni-predicted HMVP candidates from List 1, and bi-predicted HMVP candidates, respectively. The at least one table is updated with the motion information of part of sub-portions of the first block. The at least one table is updated with the motion information of a first sub-portion and the motion information of a second sub-portion, the first sub-portion and the second sub-portion being sub-portion s of the first block. The at least one table is updated with the motion information of a first sub-portion and the motion information of a second sub-portion by adding one HMVP candidate. Whether to update the at least one table by adding one or two motions candidates depends on whether the first sub-portion and the second sub-portion are using a same reference picture list or a same reference picture. Whether to update the at least one table by adding motion information of the first sub-portion or the second sub-portion depends on a picture order count (POC) difference between a reference picture and a current picture. Ffter processing the block with the non-rectangular and non-square portion, the motion information of the block with the non-rectangular and non-square portion is used to update the table maintained to store the HMVP candidates for block with the non-rectangular and non-square portion. After processing the block without the non-rectangular and non-square portion, the motion information of the block without the non-rectangular and non-square portion is used to update the table maintained to store the HMVP candidates for block without the non-rectangular and non-square portion. After processing the block without the non-rectangular and non-square portion, the motion information of the block without the non-rectangular and non-square portion is used to update the table maintained to store the motion vector prediction (HMVP) candidates for block with the non-rectangular and non-square portion. The geometry partition mode comprises a triangular partitioning mode. The method is applicable to other kinds of motion candidate lists.

Figure 42:
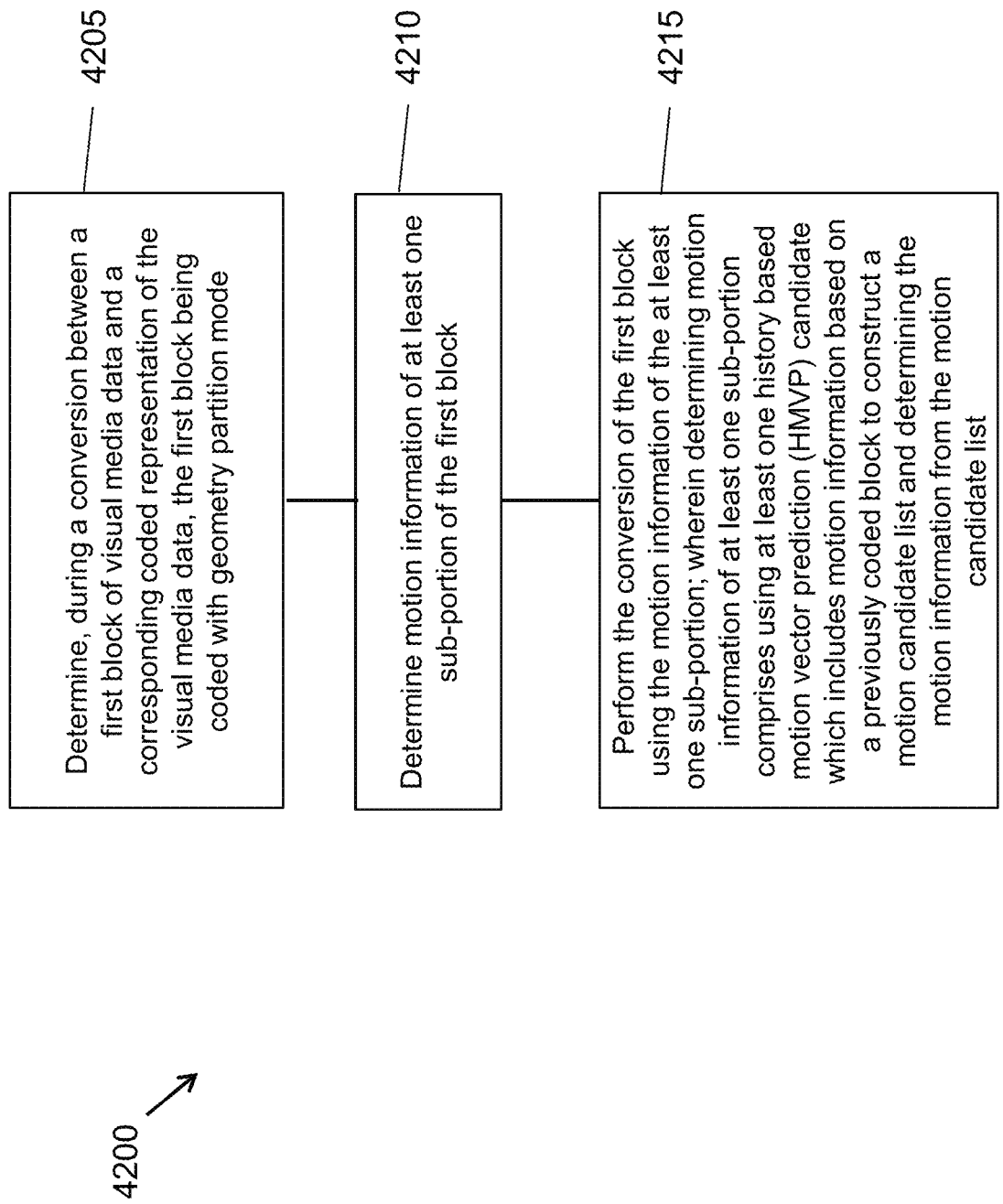
FIG. 42 is a flowchart for an example of a video processing method.

FIG. 42 is a flowchart for a method 4200 of processing a video. The method 4200 includes determining (4205), during a conversion between a first block of visual media data and a corresponding coded representation of the visual media data, the first block being coded with geometry partition mode; determining (4210) motion information of at least one sub-portion of the first block; performing (4215) performing the conversion of the first block using the motion information of the at least one sub-portion; wherein determining motion information of at least one sub-portion comprises using at least one history based motion vector prediction (HMVP) candidate which includes motion information based on a previously coded block to construct a motion candidate list and determining the motion information from the motion candidate list.

In some implementations, additional modifications can be performed to method 4200. For example, the first block being coded with geometry partition mode comprises: splitting the first block to multiple sub-portions; wherein at least one of the multiple sub-portions is a non-rectangular and non-square portion. The at least one HMVP candidate is directly added to the motion candidate list. The using at least one HMVP candidate which includes motion information based on a previously coded block to construct a motion candidate list comprises: using one HMVP candidate to determine a first motion candidate and a second motion candidate, one of the first motion candidate and the second motion candidate being uni-prediction with List 0 motion information of the HMVP candidate, and the other being uni-prediction with List 1 motion information of the HMVP candidate. Performing a pruning in response to inserting a motion candidate derived from the HMVP candidate with other motion candidates that are based on spatial or temporal video blocks. Performing a pruning in response to inserting a motion candidate derived from the HMVP candidate with other motion candidates that are based on other HMVP candidates. Performing a pruning in response to inserting a motion candidate derived from the HMVP candidate with other motion candidates that are based on the HMVP candidate. The using at least one HMVP candidate which includes motion information based on a previously coded block to construct a motion candidate list comprises: adding at least one motion candidate derived from the HMVP candidate to the motion candidate list after motion candidates derived from one or both of spatial or temporal blocks. The using at least one HMVP candidate which includes motion information based on a previously coded block to construct a motion candidate list comprises: adding at least one motion candidate derived from the HMVP candidate to the motion candidate list after or before a pre-defined step in a motion candidate list construction process based on motion information of spatial or temporal blocks. The using at least one HMVP candidate which includes motion information based on a previously coded block to construct a motion candidate list comprises: adding at least one motion candidate derived from the HMVP candidate to the motion candidate list after or before multiple pre-defined steps in a motion candidate list construction process based on motion information of spatial or temporal blocks. The using at least one HMVP candidate which includes motion information based on a previously coded block to construct a motion candidate list comprises: adding at least one motion candidate derived from the HMVP candidate with uni-prediction to the motion candidate list after all originally uni-predicted candidates. The using at least one HMVP candidate which includes motion information based on a previously coded block to construct a motion candidate list comprises: adding at least one motion candidate derived from the HMVP candidate with uni-prediction from List 0 or bi-prediction to the motion candidate list after truncated List 0 predicted candidates. The using at least one HMVP candidate which includes motion information based on a previously coded block to construct a motion candidate list comprises: adding at least one motion candidate derived from the HMVP candidate with uni-prediction from List 1 or bi-prediction to the motion candidate list after truncated List 1 predicted candidates. The using at least one HMVP candidate which includes motion information based on a previously coded block to construct a motion candidate list comprises: adding at least one motion candidate derived from the at least one HMVP candidate to the motion candidate list after averaged uni-prediction from List 0 or List 1 motion candidates. The using at least one HMVP candidate which includes motion information based on a previously coded block to construct a motion candidate list comprises: adding at least one motion candidates derived from the at least one HMVP candidate to the motion candidate list before averaged uni-prediction from List 0 or List 1 motion candidates. The using at least one HMVP candidate which includes motion information based on a previously coded block to construct a motion candidate list comprises: adding at least one motion candidate derived from the HMVP candidate to the motion candidate list in accordance with interleaving with motion candidates that are based on motion information of spatial or temporal blocks in relation to the current block. The derived motion candidate from a HMVP candidate is set equal to the HMVP candidate. The using at least one HMVP candidate which includes motion information based on a previously coded block to construct a motion candidate list comprises: adding at least one motion candidate derived from List 0 and List 1 of the HMVP candidate to the motion candidate list before motion candidates derived from List 0 and List 1 of another HMVP candidate. The using at least one HMVP candidate which includes motion information based on a previously coded block to construct a motion candidate list comprises: adding at least one motion candidate derived from List 0 of a first set of HMVP candidates to the motion candidate list before the motion candidates derived from List 1 of a second set of HMVP candidates. The first set and the second set are the same. The first set and the second set are different, and the first set includes HMVP candidates with uni-prediction from List 0 and bi-prediction, the second set includes HMVP candidates with uni-prediction from List 1 and bi-prediction. The first set includes a first number of HMVP candidates, the second set includes a second number of HMVP candidates, and the first number and the second number are different. The using at least one HMVP candidate which includes motion information based on a previously coded block to construct a motion candidate list comprises: scaling the HMVP candidates of list LX to list L(1−X) to generate the scaled HMVP candidates which are used for the L(1−X). The using at least one HMVP candidate which includes motion information based on a previously coded block to construct a motion candidate list comprises: adding the scaled HMVP candidates after other motion candidates derived from HMVP candidates. The using at least one HMVP candidate which includes motion information based on a previously coded block to construct a motion candidate list comprises: adding the scaled HMVP candidates after other motion candidates derived from HMVP candidates and before temporal candidates. A checking order of HMVP candidates to be added to the motion candidate list is based on indices of the HMVP candidates. A checking order of HMVP candidates to be added to the motion candidate list is based on prediction directions. A checking order of HMVP candidates to be added to the motion candidate list is based on motion information. A number of HMVP candidates to be checked in the motion candidate list construction process is pre-defined. A number of HMVP candidates to be checked in the motion candidate list construction process is based on a block size of the current block, a block shape of the current block, or a number of candidates available before checking HMVP candidates. A number of HMVP candidates to be checked in the motion candidate list construction process is signaled in a video parameter set (VPS), a sequence parameter set (SPS), a picture parameter set (PPS), a picture header, a tile group header, a slice header, a group of rows of coding tree units (CTUs), a CTU, or a group of CTUs. The HMVP candidates selected to be checked in the motion candidate list are based on at least one of a prediction direction, a motion vector (MV) information, a reference picture index, a POC distances of reference picture and current picture of a candidate and a candidate index. An application of HMVP to the current block is based on a block size of the current block or a block shape of the current block. The motion candidate list comprises a merge list. The motion candidate list is applicable to other kinds of motion candidate lists exclude the merge candidate list.

Some features preferably implemented by some embodiments are now disclosed in clause-based format.

1. A method for processing video, comprising:
   determining, during a conversion between a current block of visual media data and a corresponding coded representation of the visual media data, multiple sub-portions for the current block;
   determining intra prediction information of the multiple sub-portions;
   performing the conversion of the current block using the intra prediction information of the multiple sub-portions; and
   wherein the current block is intra-coded, and at least one of the multiple sub-portions is a non-rectangular and non-square sub-portion.

2. The method of claim 1, wherein determining intra prediction information of the multiple sub-portions comprises:
   determining a first intra prediction information of a first sub-portion in the multiple sub-portions using a first intra prediction mode;
   determining a second intra prediction information of a second sub-portion in the multiple sub-portions using a second intra prediction mode;
   wherein the first intra prediction mode is different from the second intra prediction mode.

3. The method of claim 2, wherein the first intra prediction information is determined by using a first subset of intra prediction modes, and the second intra prediction information is determined by using second subset of intra prediction modes;
wherein the first subset of intra prediction modes is different from the second subset of intra prediction modes.

4. The method of claim 3, wherein the subset of intra prediction modes is based on at least one of a position, a size and a shape of the first sub-portion and/or second sub-portion.

5. The method of anyone of claims 1 to 4, wherein determining intra prediction information of the multiple sub-portions further comprises:
filtering prediction values of samples along an edge boundary of the at least one of the multiple sub-portions.

6. The method of anyone of claims 1 to 5, wherein first intra prediction information of a first sub-portion of the multiple sub-portions is determined without using the second intra prediction information of a second sub-portion of the multiple sub-portions, and the second intra prediction information of the second sub-portion is determined without using the first intra prediction information of the first sub-portion.

7. The method of anyone of claims 1to 5, wherein first intra prediction information of a first sub-portion of the multiple sub-portions is determined using second intra prediction information of a second sub-portion of the multiple sub-portions, and/or the second intra prediction information of the second sub-portion is determined using the first intra prediction information of the first sub-portion.

8. A method for processing video, comprising:
determining, during a conversion between a current block of visual media data and a corresponding coded representation of the visual media data, multiple sub-portions for the current block;
determining motion information of the multiple sub-portions;
performing the conversion of the current block using the motion information of the multiple sub-portions; and
wherein the current block is non-merge inter-coded, and at least one of the multiple sub-portions is a non-rectangular and non-square sub-portion.

9. The method of claim 8, wherein determining motion information of the multiple sub-portions comprises:
determining a first motion information of a first sub-portion in the multiple sub-portions using a first intra prediction mode;
determining a second motion information of a second sub-portion in the multiple sub-portions using a second intra prediction mode.

10. The method of anyone of claims 8-9, wherein determining intra prediction of the multiple sub-portions further comprises:
filtering prediction values of samples along an edge boundary of the at least one of the multiple sub-portions.

11. The method of anyone of claims 8-9, wherein the first motion information of the first sub-portion is determined without using the second motion information of the second sub-portion, and the second motion information of the second sub-portion is determined without using the first motion information of the first sub-portion.

12. The method of anyone of claims 8-9, wherein the first motion information of the first sub-portion is determined using the second motion information of the second prediction, and/or the second motion information of the second sub-portion is determined using the first motion information of the first sub-portion.

13. A method of video processing, comprising:
performing a conversion between a current block of visual media data and a corresponding coded representation of the visual media data, wherein the current block is partitioned into multiple sub-portions according to a splitting pattern in which a first sub-portion has a non-rectangular, non-square shape;
processing a first sub-portion with intra coding mode; and
processing a second sub-portion with inter coding mode.

14. The method of claim 13, wherein the second sub-portion is processed by applying bi-prediction.

15. The method of anyone of claims 13-14, further comprises:
signaling motion information with an merge index in response to the current block being coded with merge mode.

16. The method of anyone of claims 13-15, further comprises:
determining motion information of the first predication portion using a subset of intra prediction mode.

17. The method of claim 16, wherein the subset of intra prediction modes is based on at least one of a position of the first predication portion, a size of a first predication portion and a shape of a first predication portion.

18. A method of video processing, comprising:
performing a conversion between a current block of visual media data and a corresponding coded representation of the visual media data, wherein the current block is partitioned into multiple sub-portions according to a splitting pattern in which a first sub-portion has a non-rectangular, non-square shape;
wherein the at least one of the multiple sub-portions is merge or non-merge inter coded and uses a current picture as a reference picture.

19. A method of video processing, comprising:
performing a conversion between a current block of visual media data and a corresponding coded representation of the visual media data, wherein the current block is partitioned into multiple sub-portions according to a splitting pattern in which a first prediction partition has a non-rectangular, non-square shape;
and performing the conversion using inter or intra coded information of one or more non-adjacent spatial blocks.

20. The method of claim 19, wherein the inter or intra coded information of one or more non-adjacent spatial blocks comprises motion information of the one or more non-adjacent spatial blocks.

21. The method of claim 19, wherein performing the conversion of the current block using inter or intra coded information of one or more non-adjacent spatial blocks comprises:
performing the conversion of the current block using intra prediction mode of the one or more non-adjacent spatial blocks.

22. The method of claim 19, wherein coded information of temporal blocks is used.

23. A video processing apparatus comprising a processor configured to implement a method recited in anyone of claims 1 to 22.

24. The apparatus of claim 23, wherein the apparatus is a video encoder.

25. The apparatus of claim 23, wherein the apparatus is a video decoder.
26. A computer readable recoding media on which a program comprising code is recorded, the program is for a processor to carry out a method recited in anyone of claims 1 to 22.

Some features preferably implemented by some embodiments are now disclosed in clause-based format.

1. A method for processing video, comprising:
determining, during a conversion between a first block of visual media data and a corresponding coded representation of the visual media data, the first block being coded with geometry partition mode;
determining, based on at least one table storing history based motion vector prediction (HMVP) candidates which include motion information based on previously coded blocks, motion information of at least one sub-portion of the first block;
performing the conversion of the first block using the determined motion information.

2 A method of clause 1, wherein the first block being coded with geometry partition mode comprises:
splitting the first block to multiple sub-portions;
wherein at least one of the multiple sub-portions is a non-rectangular and non-square portion.

3. The method of clause 1, further comprising:
determining, during a conversion between a second block of the visual media data and the corresponding coded representation of the visual media data, motion information of the second block based on the same table that is used for the first block,
and the second block is not using the geometry partition mode.

4. The method of anyone of clauses 1-3, wherein the motion information used by the first block is refrained from being stored in the at least one table.

5. The method of anyone of clauses 1-4, wherein the at least one table is not updated after the conversion of the first block.

6. The method of anyone of clauses 1-5, wherein the at least one table includes multiple tables maintained to store the HMVP candidates for blocks with the geometry partition mode.

7. The method of clause 6, wherein for the at least one table, the stored HMVP candidates only have motion information according to that used by blocks with the geometry partition mode.

8. The method of anyone of clauses 1-7, wherein the at least one table includes two tables maintained to store uni-predicted HMVP candidates and bi-predicted HMVP candidates, respectively.

9. The method of anyone of clauses 1-8, wherein the at least one table includes two tables maintained to store motion information of a first sub-portion and a second sub-portion of the first block, respectively.

10. The method of anyone of clauses 1-9, wherein the at least one table includes two tables maintained to store motion information of List 0 and List 1, respectively.

11. The method of anyone of clauses 1-10, wherein the at least one table includes three tables maintained to store uni-predicted HMVP candidates from List 0, uni-predicted HMVP candidates from List 1, and bi-predicted HMVP candidates, respectively.

12. The method of anyone of clauses 1-11, wherein the at least one table is updated with the motion information of part of sub-portions of the first block.

13. The method of anyone of clauses 1-12, wherein the at least one table is updated with the motion information of a first sub-portion and the motion information of a second sub-portion, the first sub-portion and the second sub-portion being sub-portion s of the first block.

14. The method of clause 13, wherein the at least one table is updated with the motion information of a first sub-portion and the motion information of a second sub-portion by adding one HMVP candidate.

15. The method of clause 14, wherein whether to update the at least one table by adding one or two motions candidates depends on whether the first sub-portion and the second sub-portion are using a same reference picture list or a same reference picture.

16. The method of clause 14, wherein whether to update the at least one table by adding motion information of the first sub-portion or the second sub-portion depends on a picture order count (POC) difference between a reference picture and a current picture.

17. The method of any one of clauses 1 to 16, wherein the method further comprises:
after processing the block with the non-rectangular and non-square portion, the motion information of the block with the non-rectangular and non-square portion is used to update the table maintained to store the HMVP candidates for block with the non-rectangular and non-square portion.

18. The method of clause 1 to 16, the method further comprises:
after processing the block without the non-rectangular and non-square portion, the motion information of the block without the non-rectangular and non-square portion is used to update the table maintained to store the HMVP candidates for block without the non-rectangular and non-square portion.

19. The method of clause 1 to 16, the method further comprises:
after processing the block without the non-rectangular and non-square portion, the motion information of the block without the non-rectangular and non-square portion is used to update the table maintained to store the motion vector prediction (HMVP) candidates for block with the non-rectangular and non-square portion.

20. The method of anyone of clauses 1-19, wherein the geometry partition mode comprises a triangular partitioning mode.

21. The method of anyone of clauses 1-20, wherein the method is applicable to other kinds of motion candidate lists.

22. A video processing apparatus comprising a processor configured to implement a method recited in anyone of clauses 1 to 21.

23. The apparatus of clause 22, wherein the apparatus is a video encoder.

24. The apparatus of clause 22, wherein the apparatus is a video decoder.

25. A computer readable recoding media on which a program comprising code is recorded, the program is for a processor to carry out a method recited in anyone of clauses 1 to 21.

Some features preferably implemented by some embodiments are now disclosed in clause-based format.

1. A method for processing video, comprising:
determining, during a conversion between a first block of visual media data and a corresponding coded representation of the visual media data, the first block being coded with geometry partition mode;

determining motion information of at least one sub-portion of the first block;
performing the conversion of the first block using the motion information of the at least one sub-portion;
wherein determining motion information of at least one sub-portion comprises using at least one history based motion vector prediction (HMVP) candidate which includes motion information based on a previously coded block to construct a motion candidate list and determining the motion information from the motion candidate list.

2 The method of clause 1, wherein the first block being coded with geometry partition mode comprises:
splitting the first block to multiple sub-portions;
wherein at least one of the multiple sub-portions is a non-rectangular and non-square portion.

3. The method of clause 1, wherein
the at least one HMVP candidate is directly added to the motion candidate list.

4. The method of anyone of clauses 1-3, wherein the using at least one HMVP candidate which includes motion information based on a previously coded block to construct a motion candidate list comprises:
using one HMVP candidate to determine a first motion candidate and a second motion candidate, one of the first motion candidate and the second motion candidate being uni-prediction with List 0 motion information of the HMVP candidate, and the other being uni-prediction with List 1 motion information of the HMVP candidate.

5. The method of anyone of clauses 1-4, further comprising:
performing a pruning in response to inserting a motion candidate derived from the HMVP candidate with other motion candidates that are based on spatial or temporal video blocks.

6. The method of anyone of clauses 1-5, further comprising:
performing a pruning in response to inserting a motion candidate derived from the HMVP candidate with other motion candidates that are based on other HMVP candidates.

7. The method of anyone of clauses 1-6, further comprising:
performing a pruning in response to inserting a motion candidate derived from the HMVP candidate with other motion candidates that are based on the HMVP candidate.

8. The method of anyone of clauses 1-7, wherein the using at least one HMVP candidate which includes motion information based on a previously coded block to construct a motion candidate list comprises:
adding at least one motion candidate derived from the HMVP candidate to the motion candidate list after motion candidates derived from one or both of spatial or temporal blocks.

9. The method of anyone of clauses 1-8, wherein the using at least one HMVP candidate which includes motion information based on a previously coded block to construct a motion candidate list comprises:
adding at least one motion candidate derived from the HMVP candidate to the motion candidate list after or before a pre-defined step in a motion candidate list construction process based on motion information of spatial or temporal blocks.

10. The method of anyone of clauses 1-9, wherein the using at least one HMVP candidate which includes motion information based on a previously coded block to construct a motion candidate list comprises:
adding at least one motion candidate derived from the HMVP candidate to the motion candidate list after or before multiple pre-defined steps in a motion candidate list construction process based on motion information of spatial or temporal blocks.

11. The method of anyone of clauses 1-10, wherein the using at least one HMVP candidate which includes motion information based on a previously coded block to construct a motion candidate list comprises:
adding at least one motion candidate derived from the HMVP candidate with uni-prediction to the motion candidate list after all originally uni-predicted candidates.

12. The method of anyone of clauses 1-11, wherein the using at least one HMVP candidate which includes motion information based on a previously coded block to construct a motion candidate list comprises:
adding at least one motion candidate derived from the HMVP candidate with uni-prediction from List 0 or bi-prediction to the motion candidate list after truncated List 0 predicted candidates.

13. The method of anyone of clauses 1-12, wherein the using at least one HMVP candidate which includes motion information based on a previously coded block to construct a motion candidate list comprises:
adding at least one motion candidate derived from the HMVP candidate with uni-prediction from List 1 or bi-prediction to the motion candidate list after truncated List 1 predicted candidates.

14. The method of anyone of clauses 1-13, wherein the using at least one HMVP candidate which includes motion information based on a previously coded block to construct a motion candidate list comprises:
adding at least one motion candidate derived from the at least one HMVP candidate to the motion candidate list after averaged uni-prediction from List 0 or List 1 motion candidates.

15. The method of anyone of clauses 1-14, wherein the using at least one HMVP candidate which includes motion information based on a previously coded block to construct a motion candidate list comprises:
adding at least one motion candidates derived from the at least one HMVP candidate to the motion candidate list before averaged uni-prediction from List 0 or List 1 motion candidates.

16. The method of anyone of clauses 1-15, wherein the using at least one HMVP candidate which includes motion information based on a previously coded block to construct a motion candidate list comprises:
adding at least one motion candidate derived from the HMVP candidate to the motion candidate list in accordance with interleaving with motion candidates that are based on motion information of spatial or temporal blocks in relation to the current block.

17. The method of anyone of clauses 8-16, wherein
the derived motion candidate from a HMVP candidate is set equal to the HMVP candidate 18. The method of anyone of clauses 1-17, wherein the using at least one HMVP candidate which includes motion information based on a previously coded block to construct a motion candidate list comprises:
adding at least one motion candidate derived from List 0 and List 1 of the HMVP candidate to the motion candidate list before motion candidates derived from List 0 and List 1 of another HMVP candidate.

19. The method of anyone of clauses 1-18, wherein the using at least one HMVP candidate which includes motion information based on a previously coded block to construct a motion candidate list comprises:
adding at least one motion candidate derived from List 0 of a first set of HMVP candidates to the motion candidate list before the motion candidates derived from List 1 of a second set of HMVP candidates.

20. The method of clause 19, wherein the first set and the second set are the same.

21. The method of clause 19, wherein the first set and the second set are different, and the first set includes HMVP candidates with uni-prediction from List 0 and bi-prediction, the second set includes HMVP candidates with uni-prediction from List 1 and bi-prediction.

22. The method of clause 19, wherein the first set includes a first number of HMVP candidates, the second set includes a second number of HMVP candidates, and the first number and the second number are different.

23. The method of anyone of clauses 1-22, wherein the using at least one HMVP candidate which includes motion information based on a previously coded block to construct a motion candidate list comprises:
scaling the HMVP candidates of list LX to list L(1−X) to generate the scaled HMVP candidates which are used for the L(1−X).

24. The method of clause 23, wherein the using at least one HMVP candidate which includes motion information based on a previously coded block to construct a motion candidate list comprises:
adding the scaled HMVP candidates after other motion candidates derived from HMVP candidates.

25. The method of clause 23, wherein the using at least one HMVP candidate which includes motion information based on a previously coded block to construct a motion candidate list comprises:
adding the scaled HMVP candidates after other motion candidates derived from HMVP candidates and before temporal candidates.

26. The method of anyone of clauses 1-25, wherein a checking order of HMVP candidates to be added to the motion candidate list is based on indices of the HMVP candidates.

27. The method of anyone of clauses 1-25, wherein a checking order of HMVP candidates to be added to the motion candidate list is based on prediction directions.

28. The method of anyone of clauses 1-25, wherein a checking order of HMVP candidates to be added to the motion candidate list is based on motion information.

29. The method of anyone of clauses 1-28, wherein a number of HMVP candidates to be checked in the motion candidate list construction process is pre-defined.

30. The method of anyone of clauses 1-28, wherein a number of HMVP candidates to be checked in the motion candidate list construction process is based on a block size of the current block, a block shape of the current block, or a number of candidates available before checking HMVP candidates.

31. The method of anyone of clauses 1-28, wherein a number of HMVP candidates to be checked in the motion candidate list construction process is signaled in a video parameter set (VPS), a sequence parameter set (SPS), a picture parameter set (PPS), a picture header, a tile group header, a slice header, a group of rows of coding tree units (CTUs), a CTU, or a group of CTUs.

32. The method of anyone of clauses 1-28, wherein the HMVP candidates selected to be checked in the motion candidate list are based on at least one of a prediction direction, a motion vector (MV) information, a reference picture index, a POC distances of reference picture and current picture of a candidate and a candidate index.

33. The method of anyone of clauses 1-28, wherein an application of HMVP to the current block is based on a block size of the current block or a block shape of the current block.

34. The method of anyone of clauses 1-33, wherein the motion candidate list comprises a merge list.

35. The method of anyone of clauses 1-33, wherein the motion candidate list is applicable to other kinds of motion candidate lists exclude the merge candidate list.

36. A video processing apparatus comprising a processor configured to implement a method recited in anyone of clauses 1 to 35.

37. The apparatus of clause 36, wherein the apparatus is a video encoder.

38. The apparatus of clause 36, wherein the apparatus is a video decoder.

39. A computer readable recoding media on which a program comprising code is recorded, the program is for a processor to carry out a method recited in anyone of clauses 1 to 35.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for processing video data, comprising:
    determining, during a conversion between a first block of a video and a bitstream of the video, the first block being coded with a geometric partitioning mode;
    constructing a motion candidate list for the first block, wherein the constructing the motion candidate list includes determining whether one or more motion candidates derived from spatial and/or temporal blocks are added into the motion candidate list, and at least one motion candidate derived from a motion vector prediction (HMVP) table is allowed to be added into the motion candidate list after the one or more motion candidates derived from the spatial and/or temporal blocks;
    determining, based on the motion candidate list, motion information of the first block;
    performing the conversion of the first block using the determined motion information of the first block.

2. The method of claim 1, wherein the motion information used for the first block is refrained from being stored in the HMVP table.

3. The method of claim 1, wherein the HMVP table is not updated after the conversion of the first block.

4. The method of claim 1, further comprising:
    determining, during a conversion between a second block of the video and the bitstream of the video, motion information of the second block based on the same HMVP table that is used for the first block,
    wherein the second block is not using the geometric partitioning mode.

5. The method of claim 1, wherein the motion candidate list corresponds to a merge candidate list.

6. The method of claim 1, further comprising:
    determining a GPM merge index included in the bitstream, wherein the GPM merge index is used to determine the motion information of the first block based on the motion candidate list.

7. The method of claim 1, wherein the derived at least one motion candidate from the HMVP table is set equal to corresponding at least one motion candidate in the HMVP table.

8. The method of claim 1, wherein a checking order of motion candidates in the HMVP table to be added to the motion candidate list is based on indices of motion candidates in the HMVP table.

9. The method of claim 1, wherein the geometric partitioning mode comprises a triangular partitioning mode.

10. The method of claim 1, wherein the conversion comprises decoding the first block from the bitstream.

11. The method of claim 1, wherein the conversion comprises encoding the first block into the bitstream.

12. An apparatus for processing video data comprising a processor and a non-transitory memory with instructions thereon, wherein the instructions upon execution by the processor, cause the processor to:
    determine, during a conversion between a first block of a video and a bitstream of the video, the first block being coded with a geometric partitioning mode;
    constructing a motion candidate list for the first block, wherein the constructing the motion candidate list includes determining whether one or more motion candidates derived from spatial and/or temporal blocks are added into the motion candidate list, and at least one motion candidate derived from a motion vector prediction (HMVP) table is allowed to be added into the motion candidate list after the one or more motion candidates derived from the spatial and/or temporal blocks;

determine, based on the motion candidate list, motion information of the first block;

perform the conversion of the first block using the determined motion information of the first block.

13. The apparatus of claim 12, wherein the motion information used for the first block is refrained from being stored in the HMVP table, and
wherein the HMVP table is not updated after the conversion of the first block.

14. The apparatus of claim 12, wherein the instructions upon execution by the processor, further cause the processor to determine, during a conversion between a second block of the video and the bitstream of the video, motion information of the second block based on the same HMVP table that is used for the first block, wherein the second block is not using the geometric partitioning mode, and
wherein the motion candidate list corresponds to a merge candidate list.

15. The apparatus of claim 12, wherein the instructions upon execution by the processor, further cause the processor to determine a GPM merge index included in the bitstream, wherein the GPM merge index is used to determine the motion information of the first block based on the motion candidate list, and
wherein the derived at least one motion candidate from the HMVP table is set equal to corresponding at least one motion candidate in the HMVP table.

16. The apparatus of claim 12, wherein a checking order of motion candidates in the HMVP table to be added to the motion candidate list is based on indices of motion candidates in the HMVP table, and
wherein the geometric partitioning mode comprises a triangular partitioning mode.

17. A non-transitory computer-readable storage medium storing instructions that cause a processor to:
determine, during a conversion between a first block of a video and a bitstream of the video, the first block being coded with a geometric partitioning mode;
constructing a motion candidate list for the first block, wherein the constructing the motion candidate list includes determining whether one or more motion candidates derived from spatial and/or temporal blocks are added into the motion candidate list, and at least one motion candidate derived from a motion vector prediction (HMVP) table is allowed to be added into the motion candidate list after the one or more motion candidates derived from the spatial and/or temporal blocks;
determine, based on the motion candidate list, motion information of the first block;
perform the conversion of the first block using the determined motion information of the first block.

18. The non-transitory computer-readable storage medium of claim 17, wherein the motion information used for the first block is refrained from being stored in the HMVP table,
wherein the HMVP table is not updated after the conversion of the first block,
wherein the instructions further cause the processor to determine, during a conversion between a second block of the video and the bitstream of the video, motion information of the second block based on the same HMVP table that is used for the first block, wherein the second block is not using the geometric partitioning mode,
wherein the motion candidate list corresponds to a merge candidate list,
wherein the instructions further cause the processor to determine a GPM merge index included in the bitstream, wherein the GPM merge index is used to determine the motion information of the first block based on the motion candidate list,
wherein the derived at least one motion candidate from the HMVP table is set equal to corresponding at least one motion candidate in the HMVP table,
wherein a checking order of motion candidates in the HMVP table to be added to the motion candidate list is based on indices of motion candidates in the HMVP table, and
wherein the geometric partitioning mode comprises a triangular partitioning mode.

19. A non-transitory computer-readable recording medium storing a bitstream representation which is generated by a method performed by a video processing apparatus, wherein the method comprises:
determining, during encoding a first block of a video into a bitstream of the video, the first block being coded with a geometric partitioning mode;
constructing a motion candidate list for the first block, wherein the constructing the motion candidate list includes determining whether one or more motion candidates derived from spatial and/or temporal blocks are added into the motion candidate list, and at least one motion candidate derived from a motion vector prediction (HMVP) table is allowed to be added into the motion candidate list after the one or more motion candidates derived from the spatial and/or temporal blocks;
determining, based on the motion candidate list, motion information of the first block;
encoding the first block into the corresponding bitstream representation using the determined motion information of the first block.

20. The non-transitory computer-readable storage medium of claim 19, wherein the motion information used for the first block is refrained from being stored in the HMVP table,
wherein the HMVP table is not updated after the encoding of the first block,
wherein the method further comprises determining, during encoding a second block of the video into the bitstream of the video, motion information of the second block based on the same HMVP table that is used for the first block, wherein the second block is not using the geometric partitioning mode,
wherein the motion candidate list corresponds to a merge candidate list,
wherein the method further comprises determining a GPM merge index included in the bitstream, wherein the GPM merge index is used to determine the motion information of the first block based on the motion candidate list,
wherein the derived at least one motion candidate from the HMVP table is set equal to corresponding at least one motion candidate in the HMVP table,
wherein a checking order of motion candidates in the HMVP table to be added to the motion candidate list is based on indices of motion candidates in the HMVP table, and
wherein the geometric partitioning mode comprises a triangular partitioning mode.

* * * * *